US007772358B2

(12) United States Patent
Tang et al.

(10) Patent No.: US 7,772,358 B2
(45) Date of Patent: Aug. 10, 2010

(54) POLYTRIAZOLES CONSTRUCTED BY 1,3-DIPOLAR CYCLOADDITION

(75) Inventors: Benzhong Tang, Hong Kong (CN); Anjun Qin, Hong Kong (CN); Matthias Haeussler, Bad Lauchstaedt (DE)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 11/896,675

(22) Filed: Sep. 5, 2007

(65) Prior Publication Data

US 2008/0103273 A1 May 1, 2008

Related U.S. Application Data

(60) Provisional application No. 60/842,371, filed on Sep. 6, 2006.

(51) Int. Cl.
*C08G 73/08* (2006.01)
*C07C 247/02* (2006.01)
*C07C 247/16* (2006.01)

(52) U.S. Cl. .................. 528/268; 528/422; 528/423; 552/8; 552/11; 544/180

(58) Field of Classification Search .............. 526/204, 526/261; 548/255, 256, 257; 552/8, 11; 544/180; 528/268, 422–423
See application file for complete search history.

(56) References Cited

U.S. PATENT DOCUMENTS

| 4,665,246 | A | * | 5/1987 | Anderson | ............... 585/320 |
|---|---|---|---|---|---|
| 5,681,904 | A | * | 10/1997 | Manzara | ............... 525/404 |
| 7,009,059 | B2 | | 3/2006 | Wurziger et al. | |
| 7,109,359 | B1 | * | 9/2006 | Dave et al. | ............... 552/11 |
| 2005/0197334 | A1 | * | 9/2005 | Wang et al. | ............ 514/227.5 |
| 2005/0203147 | A1 | * | 9/2005 | Zhou et al. | ............... 514/340 |
| 2005/0222427 | A1 | | 10/2005 | Sharpless et al. | |
| 2006/0247410 | A1 | * | 11/2006 | Tang et al. | ............... 528/86 |
| 2007/0176164 | A1 | * | 8/2007 | Sato et al. | ............... 257/40 |
| 2008/0311412 | A1 | * | 12/2008 | Fokin et al. | ............... 428/457 |

FOREIGN PATENT DOCUMENTS

WO WO 2005085176 A1 * 9/2005

OTHER PUBLICATIONS

Diaz et al. Click Chemistry in Materials Synthesis. 1. Adhesive Polymers from Copper-Catalyzed Azide-Alkyne Cycloaddition. Published Online (Wiley InterScience) Jul. 28, 2004. Journal of Polymer Science: Part A: Polymer Chemistry, 2004, vol. 42, pp. 4392-4403.*
Diaz et al. Click Chemistry in Materials Synthesis. 1. Adhesive Polymers from Copper-Catalyzed Azide-Alkyne Cycloaddition. Proof of publication date of Jul. 28, 2004. Wiley InterScience.*
Pigge et al. An Enaminone-Directed Benzannulation/Macrocyclization Approach to Cyclophane Ring Systems. J. Org. Chem., 2002, 67, pp. 4547-4552.*
Zhang et al. (Ruthenium-Catalyzed Cycloaddition of Alkynes and organic Azides. Journal of the American Chemical Society. Oct. 28, 2005. pp. 15998-15999).*
Qin et al. (Synthesis of a Hyperbranched Polytriazole by 1,3-Dipolar Polycycloaddition. Polymer Preprints. 2006, 47(2), pp. 681-682.).*
Katritzky et al. (Triazole-oligomers by 1,3-dipolar cycloaddition. ARKIVOC 2006 (v), pp. 43-62).*
Rodionov et al. (Mechanism of the Ligand-Free Cu(I)-Catalyzed Azide-Alkyne Cycloaddition Reaction. Angew. Chem. Int. Ed. 2005, 44, pp. 2210-2215).*
Katritzky et al. (Synthesis of C-Carbamoyl-1,2,3-triazoles by Microwave-Induced 1,3-Dipolar Cycloaddition of Organic Azides to Acetylenic Amides. J. Org. Chem., 2002, 67 (25). p. 9077-9079).*
Durden et al. (The Reaction of Azidoorganic Compounds with Acetylenes. Journal of Chemical Engineering Data. Apr. 1, 1964. pp. 228-232).*
Haeussler et al. (Synthesis and properties fo hyperbranched organometallic polyynes and poly(aroylarylene)s and their utilization in photolithographic patterning. PMSE Preprints. 2005, 93, pp. 869-871).*
Anonymous (1,3-Dipolar Cycloaddition to Acetylenic Compounds: New Thermosets for Electronics Packaging. ip.com. Mar. 1, 2005).*
Helms, B., et al., "Dendronized Linear Polymers via 'Click Chemistry'", *J. Am. Chem. Soc.*, vol. 126, pp. 15020-15021, (2004).
Englert, B.C., et al., "Click Chemistry as a Powerful Tool for the Construction of Functional Poly(*p*-phenyleneethynylene)s: Comparison of Pre- and Postfunctionalization Schemes", *Macromolecules*, vol. 38, pp. 5868-5877, (2005).

(Continued)

*Primary Examiner*—Milton I Cano
*Assistant Examiner*—Brieann R Fink
(74) *Attorney, Agent, or Firm*—The Nath Law Group

(57) ABSTRACT

A process of synthesizing hyperbranched polytriazoles, linear and hyperbranched poly(aroyltriazoles) by Huisgen 1,3-dipolar cycloaddition. The polytriazoles were prepared by $A_2+B_3$ method to avoid self-polymerization during monomer preparation and storage. The polymers are light emissive and can be crosslinked to generate well-resolution photopatterns upon UV irradiation. White light emission patterns were observed with fluorescence microscopy. The high molecular weight poly(aroyltriazoles) (up to 26000 Da) are prepared in high yields (up to 92.0%) and with high regioselectivity (the ratio of 1,4- and 1,5-disubstituted 1,2,3-triazole is equal or larger than 9:1). The polycyclomerization is not moisture or oxygen sensitive and therefore, no special precautions are necessary before and during the reaction. All the polymers are processible, easily film-forming, and curable into thermosets by heat or irradiation. The hyperbranched polymers can act as fluorescent adhesive materials with large tensile strength.

18 Claims, 11 Drawing Sheets

OTHER PUBLICATIONS

Binder, W.H., et al., "Combining Ring-Opening Metathesis Polymerization (ROMP) with Sharpless-Type 'Click' Reactions: An Easy Method for the Preparation of Side Chain Functionalized Poly(oxynorbornenes)", *Macromolecules*, vol. 37, pp. 9321-9330, (2004).

Tsarevsky, N.V., et al., "Step-Growth 'Click' Coupling of Telechelic Polymers Prepared by Atom Transfer Radical Polymerization", *Macromolecules*, vol. 38, pp. 3558-3561, (2005).

Scheel, A.J., et al., "Novel Hyperbranched Poly([1,2,3]-triazole)s Derived from $AB_2$ Monomers by a 1,3-Dipolar Cycloaddition", *Macromol. Rapid Commun.*, vol. 25, pp. 1175-1180, (2004).

Rostovtsev, V.V., et al., "A Stepwise Huisgen Cycloaddition Process: Copper(I)-Catalyzed Regioselective 'Ligation' of Azides and Terminal Alkynes", *Angew. Chem. Int. Ed.*, vol. 41, pp. 2596-2599, (2002).

Van Steenis, D.J.V.C., et al., "Click-chemistry as an efficient synthetic tool for the preparation of novel conjugated polymers", *Chem. Commun.*, pp. 4333-4335, (2005).

\* cited by examiner

POLYTRIAZOLES CONSTRUCTED BY 1,3-DIPOLAR CYCLOADDITION

CROSS-REFERENCE TO RELATED APPLICATIONS

This application claims the benefit of U.S. Provisional Patent Application No. 60/842,371, filed Sep. 6, 2006, the contents of which are hereby incorporated by reference in their entirety.

BACKGROUND OF THE INVENTION

1. Field of the Invention

The present disclosure relates to the synthesis of linear and hyperbranched polytriazoles by fast and region-selective 1,3-dipolar cycloaddition of organic azides and acetylenes by metal-free thermal methodology.

2. Related Art

The unique molecular structures of polytriazoles render them with novel features, such as for use with respect to photoresist and light emission. There are many publications that disclose linear polytriazoles, which were obtained by Cu(I)-catalyzed 1,3-dipolar cycloaddition reaction (for examples: Helms, B.; Mynar, J. L.; Hawker, C. J.; Fréchet, J. M. J. *J. Am. Chem. Soc.* 2004, 126, 15020. (b) Englert, B. C.; Bakbak, S.; Bunz. H. F. *Macromolecules,* 2005, 38, 5868. (c) Binder, W. H.; Kluger, C. *Macromolecules,* 2004, 37, 9321. (d) Tsarevsky, N. V.; Sumerlin, B. S.; Matyjaszewski K. *Macromolecules,* 2005, 38, 3558). But when the conditions disclosed conditions are applied for the synthesis of hyperbranched polymers, partially soluble or totally insoluble materials are always obtained (Scheel, A. J.; Komber, H.; Voit, B. I. *Macromol. Rapid. Commun.* 2004, 25, 1175), which prohibits investigation of the resultant materials and their practical applications.

After Huisgen's comprehensive review in 1984 (Huisgen, R. In *1,3-Dipolar Cycloaddition Chemistry*; Padwa, A., Ed.; Wiley: New York, 1984), the research on 1,3-dipolar cycloaddition reactions remained silent until Sharpless and coworkers recognized the potential application and found an efficient method to synthesize the regioselective 1,2,3-triazoles from organic azides and terminal acetylenes by Cu(I) catalysts. (V. V. Rostovtsev, L. G Green, V. V. okin, K. B. Sharpless *Angew. Chem. Int. Ed.* 2002, 41, 2596; and K. B. Shapless, US 2005/0222427 A1). Due to its high yield and high regioselectivity, they defined this methodology as "Click Chemistry". This breakthrough aroused tremendous interest among scientists in particular for the construction of bio-conjugated materials and only limited reports have addressed electro-optical macromolecular materials (D. J. V. C. Steenis, O. R. P. David, G. P. F. Strijdonck, J. H. Maarseveen, J. N. H. Reek *Chem. Commun.* 2005, 4333).

Because of their substantially globular molecular architectures, hyperbranched polymers are envisioned to exhibit novel properties such as low viscosity and high thermal stability and serve as functional materials. Moreover, the synthesis of hyperbranched polymers can be done in a one-pot single-step procedure. Realization of the full potential of hyperbranched polymers calls for the exploration of new, versatile methods for their syntheses, Schell, et al. reported for the first time hyperbranched polymers constructed by either Cu(I)-catalyzed or thermal 1,3-dipolar cycloadditions of $AB_2$ type monomers (where A represents one azide group and $B_2$ represents two acetylenes, all in one organic molecule; Scheel, A. J.; Komber, H.; Voit, B. I. *Macromol. Rapid. Commun.* 2004, 25, 1175). This methodology contains some disadvantages, which limit its practical applicability. Soluble hyperbranched polymers can only be obtained when the Cu(I) catalyzed 1,3-dipolar cycloaddition is performed in highly polar solvents (such as DMSO or DMF), which are difficult to remove after polymerization. Another problem is the self-polymerization of this type of monomer when stored for long time under ambient conditions.

Steenis et al. reported the light emission properties of linear polytriazoles prepared by Cu(I)-catalyzed 1,3-dipolar cycloaddition with conjugated diazides and diacetylenes. However, this methodology requires a long reaction time (up to 170 h) and may hamper again its usage when employed in practical applications. Most of the other linear polymers containing 1,2,3-triazole moieties (B. Helms, *J. Am. Chem. Soc.* 2004, 126, 15020; B. C. Englert, *Macromolecules,* 2005, 38, 5868; W. H. Binder, *Macromolecules,* 2004, 37, 9321; N. V. Tsarevsky, *Macromolecules,* 2005, 38, 3558) are again only soluble in high polar solvents, such as DMF and DMSO, which is very inconvenient for investigations of their properties and further processing.

Wurziger et al. (U.S. Pat. No. 7,009,059) reported the 1,3-dipolar cycloaddition between azides and acetylenes groups of mainly low molecular weight compounds in microreactors. Manzara (U.S. Pat. No. 5,681,904) reported cross-linked polymers. The author adopted 1,3-dipolar cycloaddition between polymers containing azido groups either in the main chain or as pendants and diacetylenic esters or amides. The resulting polymers were insoluble and the inventor did not provide any information of the regioselectivity of the product.

It is known that aroylacetylenes can be cyclotrimerized when refluxed in DMF or in mixtures with other solvents such as toluene for a long time (*J. Org. Chem.* 2002, 67, 4547). The inventors have abundant experiences on the polycyclotrimeriazation of aroylacetylene monomers (Dong, H. C.; Zheng, R. H.; Lam, J. W.-Y.; Haeussler, M.; Qin, A. J.; Tang, B. Z. *Macromolecules,* 2005, 38, 6382-6391).

Further, compounds with azido moieties can form active radicals when irradiated with UV light (Bräse, S.; Gel, C.; Knepper, K.; Zimmermann, V. *Angew. Chem. Int. Ed.* 2005, 44, 5188).

SUMMARY OF THE INVENTION

The present subject matter addresses the above concerns by teaching the following processes and products.

The present disclosure includes a process for the synthesis of polytriazoles. The process includes reacting separate azide monomers and acetylene monomers by 1,3-dipolar cycloaddition. Polymerization occurs by refluxing said monomers in an organic solvent for a set period of time.

In some aspects, the polytriazole is a hyperbranched polytriazole or a hyperbranched poly(aroyltriazole) that is synthesized by the reaction of a di-monomer and a tri-monomer, where one of the azide monomers and acetylene monomers is a di-monomer and the other monomer is a tri-monomer.

In some aspects, the acetylene monomer used in the synthesis of the hyperbranched polytriazole or the hyperbranched poly(aroyltriazole) is a diacetylene, an aromatic diacetylene, a conjugated diacetylene, a triyne, an aromatic triyne, a conjugated triyne, or an aroyldiacetylene. In some aspects, the acetylene monomer used in the synthesis of the hyperbranched polytriazole or the hyperbranched poly(aroyltriazole) has formula I, II, III, or IV:

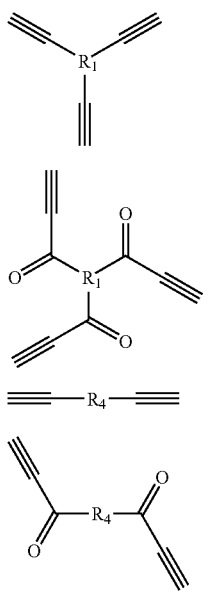

These are non-limiting examples, however, and other acetylene monomers may be used.

In some aspects, the $R_1$ group of formula I or formula II is a

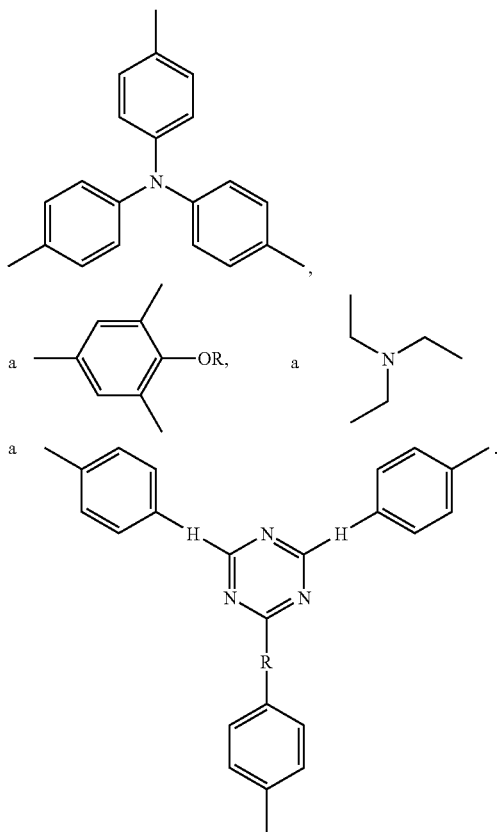

In some aspects, the $R_4$ group of formula III or formula IV is a

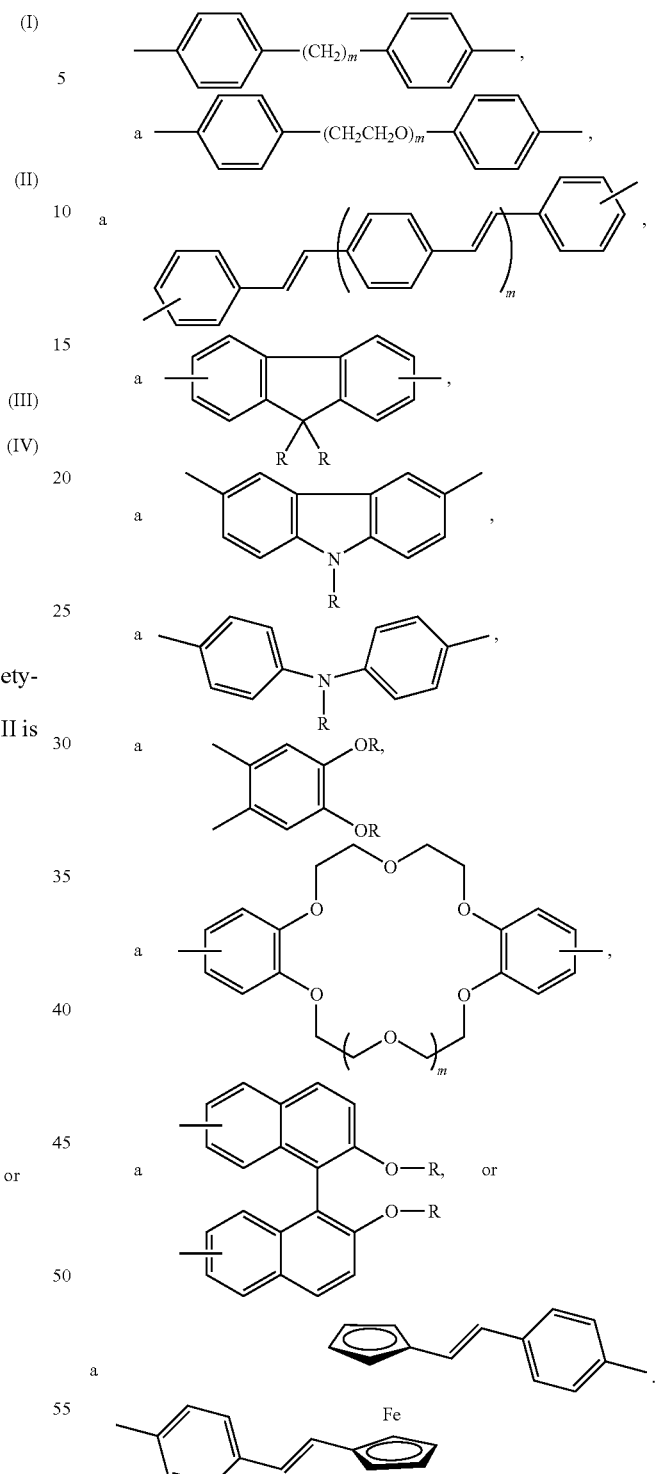

In some aspects, the R group is hydrogen, an alkyl, a vinyl, an acetyl, an aryl or a heteroaryl. In some aspects, $m \geq 1$.

In some aspects, the azide monomer used in the synthesis of the hyperbranched polytriazole or the hyperbranched poly(aroyltriazole) is a diazide, a conjugated diazide, a nonconjugated diazide, a triazide, a conjugated triazide, nonconjugated triazide, a metal containing diazide, a metal containing conjugated diazide, a metal containing nonconjugated diazide, a metal containing triazide, a metal containing conjugated triazide, or a metal containing nonconjugated triazide. In some aspects, the azide monomer used in the synthesis of the hyperbranched polytriazole or the hyperbranched poly(aroyltriazole) has formula V or VI:

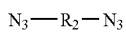
(V)

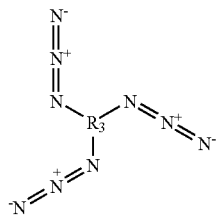
(VI)

These are non-limiting examples, however, and other azide monomers may be used.

In some aspects, the $R_2$ group of formula V is a

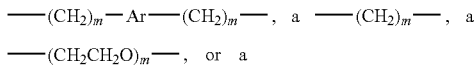

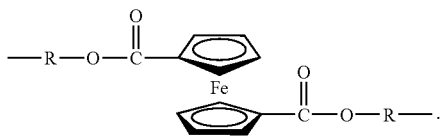

In some aspects, the Ar group is a

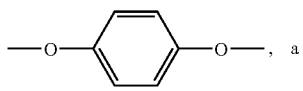

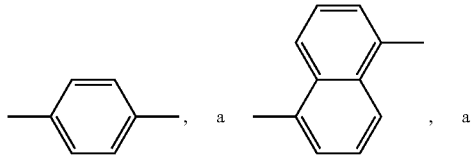

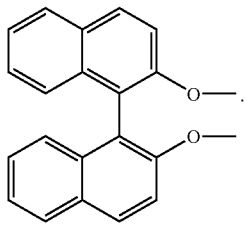

In some aspects, $m \geq 1$.

In some aspects, the $R_3$ group of formula VI is a

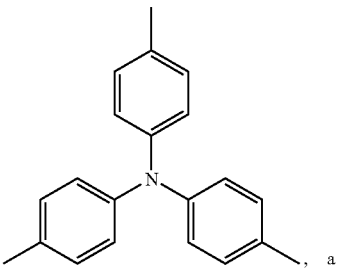
, a

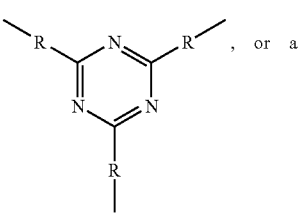
, or a

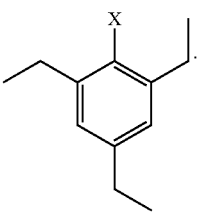
.

In some aspects, X is hydrogen, an alkyl, a vinyl, an acetyl, an aryl, a heteroaryl, or a halogen. In some aspects, the R group is hydrogen, an alkyl, a vinyl, an acetyl, an aryl, or a heteroaryl. These are non-limiting examples, however, and other groups may be used.

In some aspects, the polytriazole is a hyperbranched polytriazole which has the formula VII:

(VII)
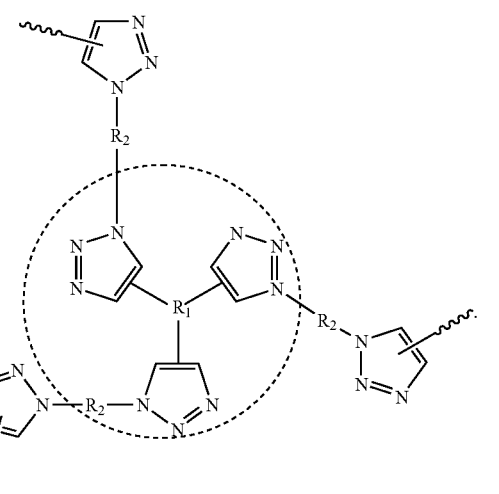

This is a non-limiting example, however, and other hyperbranched polytriazoles may be formed.

In some aspects, the $R_1$ group of formula VII is a

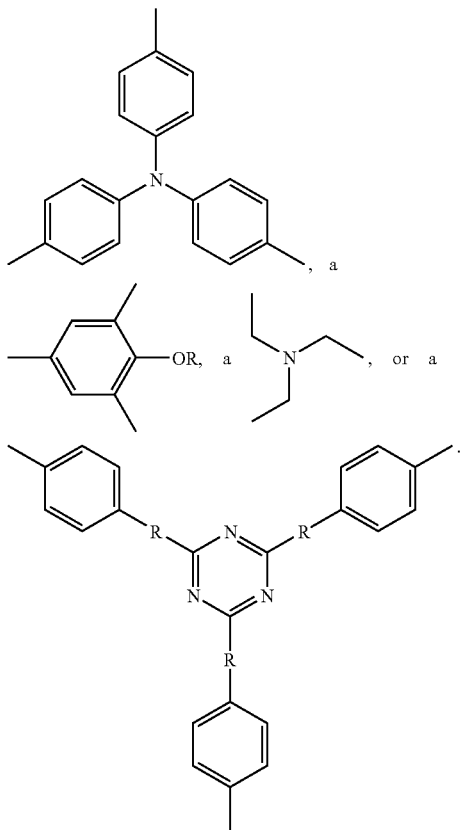

In some aspects, the $R_2$ group of formula VII is a

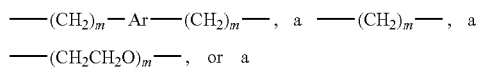

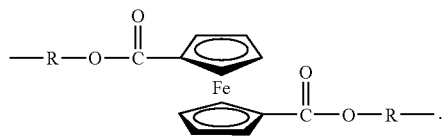

In some aspects, the Ar group is a

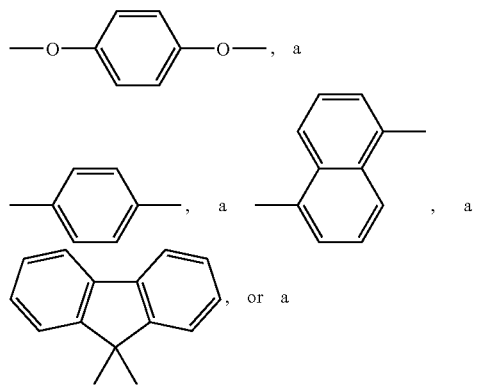

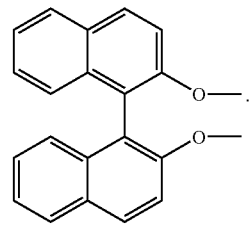

In some aspects, the R group is hydrogen, an alkyl, a vinyl, an acetyl, an aryl, or a heteroaryl. In some aspects, $m \geq 1$. These are non-limiting examples, however, and other groups may be used.

In some aspects, the polytriazole is a hyperbranched polytriazole which has the formula VIII:

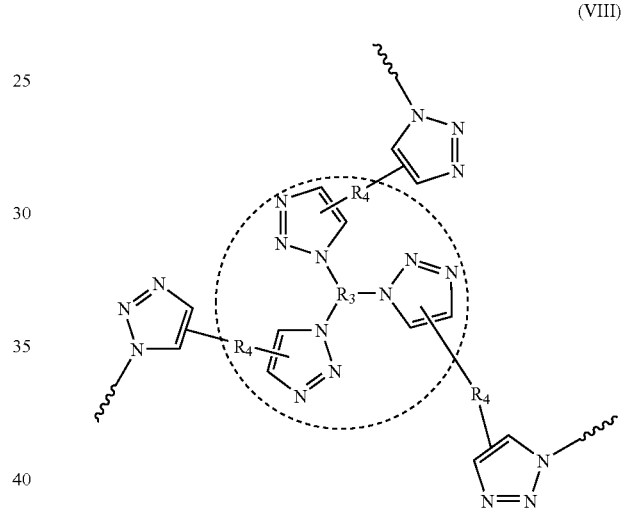

(VIII)

This is a non-limiting example, however, and other hyperbranched polytriazoles may be formed.

In some aspects, the $R_3$ group of formula VIII is a

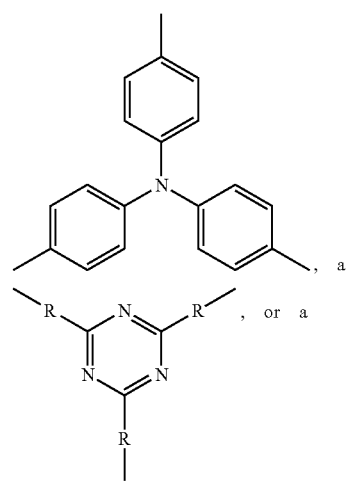

-continued

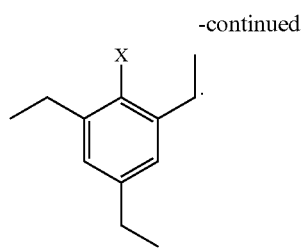

In some aspects, X is hydrogen, an alkyl, a vinyl, an acetyl, an aryl, a heteroaryl, or a halogen. In some aspects, the R group is hydrogen, an alkyl, a vinyl, an acetyl, an aryl, or a heteroaryl. These are non-limiting examples, however, and other groups may be used.

In some aspects, the $R_4$ group of formula VIII is a

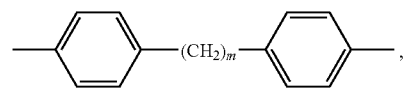

a 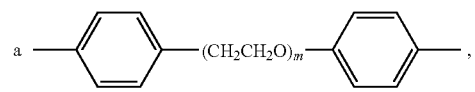

a 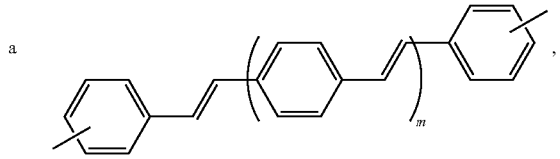

a 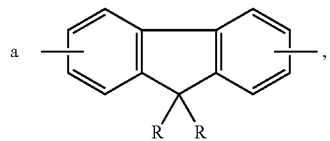

a 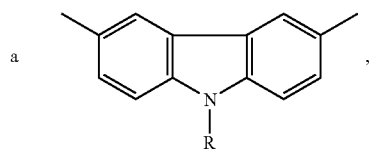

a 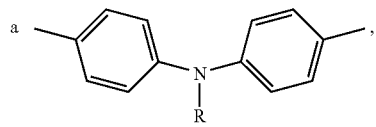

a 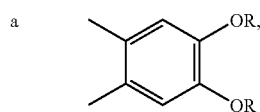

a 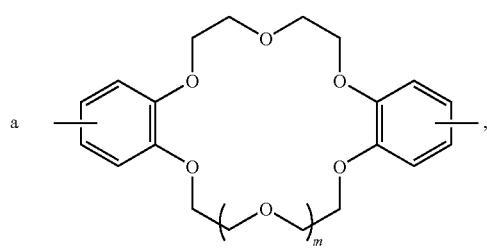

-continued

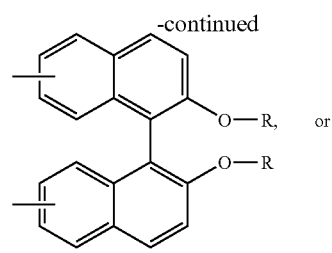

a 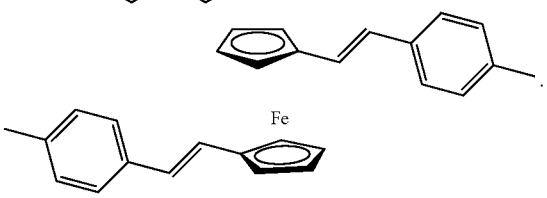

In some aspects, the R group is hydrogen, an alkyl, a vinyl, an acetyl, an aryl or a heteroaryl. In some aspects, $m \geq 1$. These are non-limiting examples, however, and other groups may be used.

In some aspects, the polytriazole is a hyperbranched poly(aroyltriazole) which has the formula IX or X:

(IX)

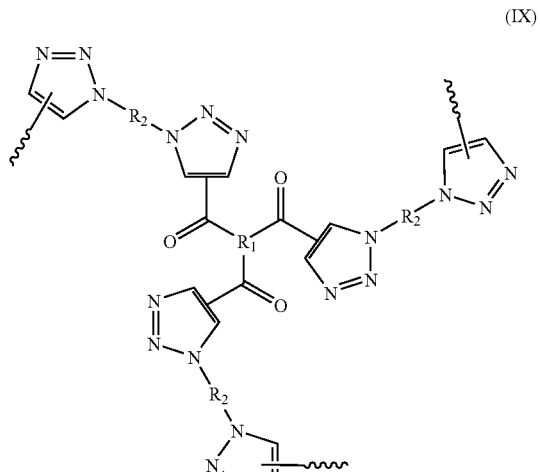

(X)

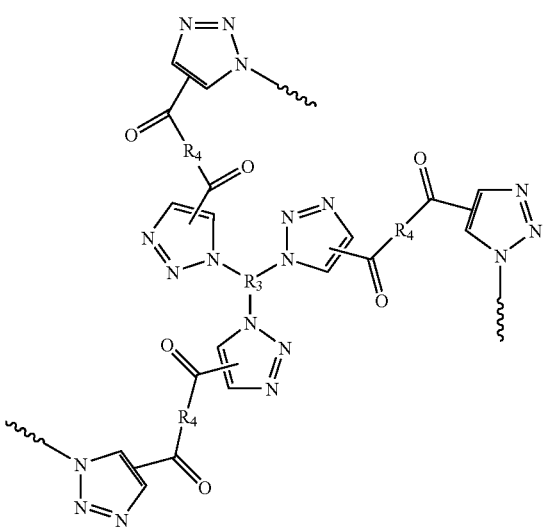

This is a non-limiting example, however, and other hyperbranched poly(aroyltriazoles) may be formed.

In some aspects, the $R_1$ group of formula IX is a

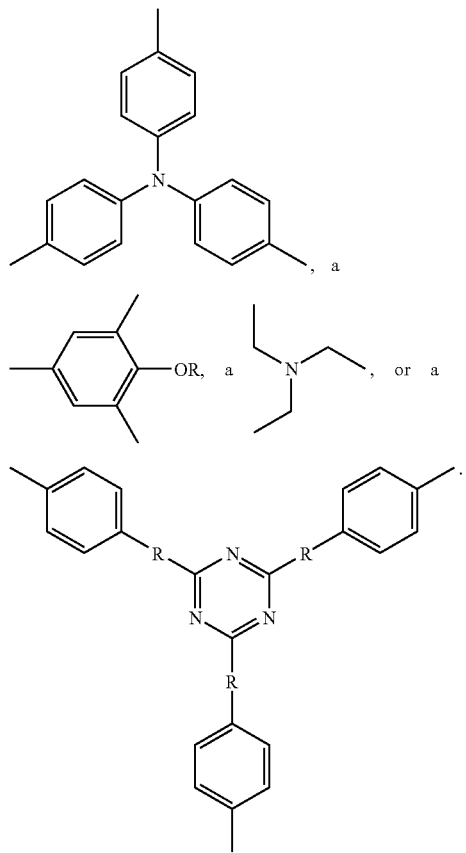

In some aspects, the $R_2$ group of formula IX is a

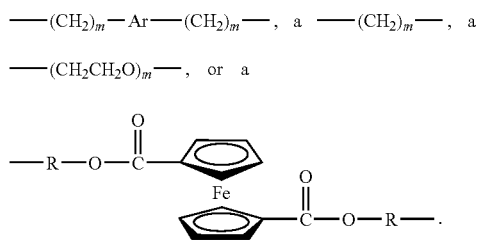

In some aspects, the Ar group is a

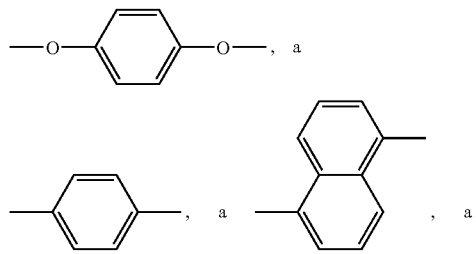

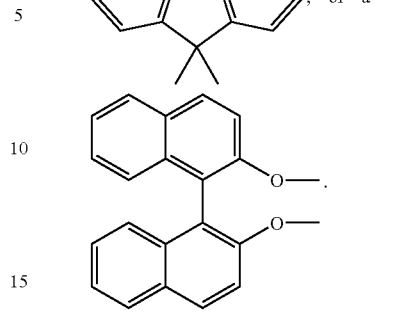

In some aspects, the R group is hydrogen, an alkyl, a vinyl, an acetyl, an aryl, or a heteroaryl. In some aspects, $m \geq 1$. These are non-limiting examples, however, and other groups may be used.

In some aspects, the $R_3$ group of formula X is a

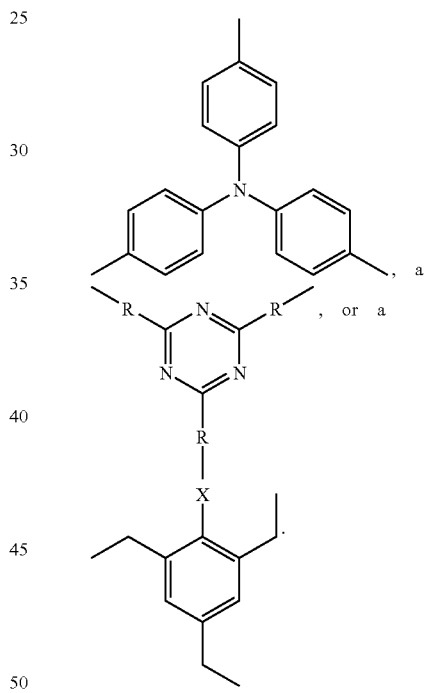

In some aspects, X is hydrogen, an alkyl, a vinyl, an acetyl, an aryl, a heteroaryl, or a halogen. In some aspects, the R group is hydrogen, an alkyl, a vinyl, an acetyl, an aryl, or a heteroaryl. These are non-limiting examples, however, and other groups may be used.

In some aspects, the $R_4$ group of formula X is a

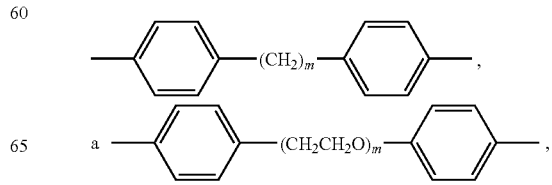

-continued

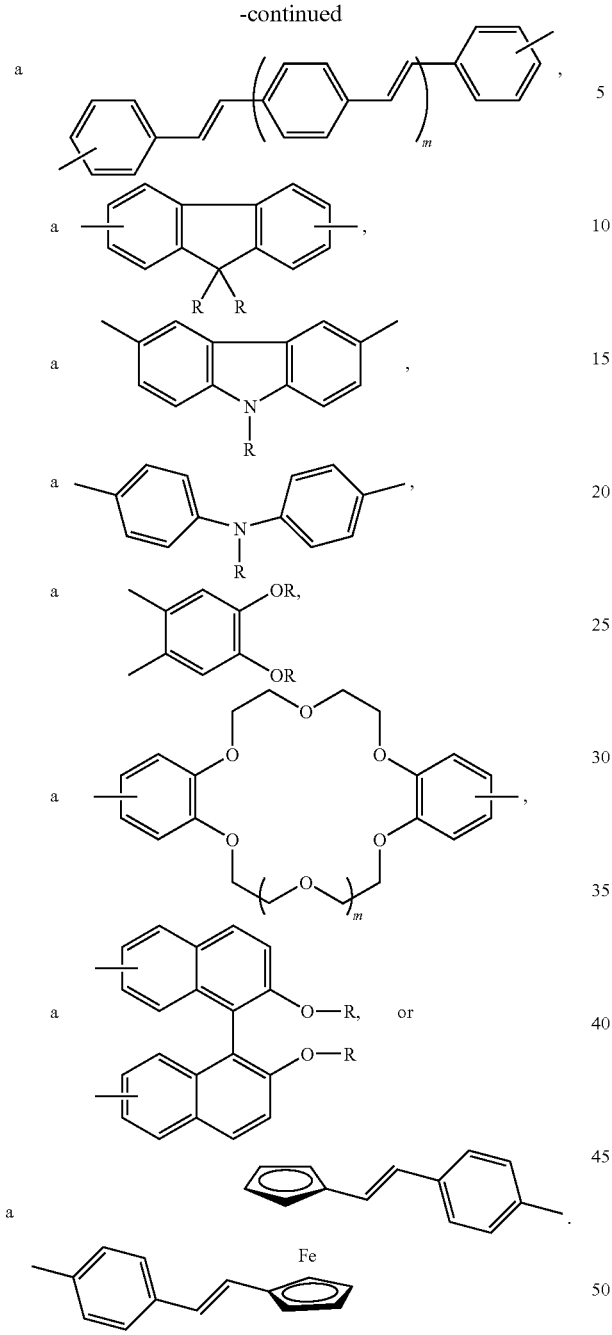

In some aspects, the R group is hydrogen, an alkyl, a vinyl, an acetyl, an aryl or a heteroaryl. In some aspects, m≧1. These are non-limiting examples, however, and other groups may be used.

In some aspects, the polytriazole is a linear poly(aroyltriazole) that is synthesized by the reaction of a diazide monomer and an aroyldiacetylene monomer. In some aspects, the diazide monomer used in the synthesis of the linear poly(aroyltriazole) is a conjugated diazide, a nonconjugated diazide, a metal containing diazide, a metal containing conjugated diazide, or a metal containing nonconjugated diazide. In some aspects, the diazide monomer used in the synthesis of the linear poly(aroyltriazole) has formula XI:

$$N_3-R_2-N_3 \qquad (XI)$$

This is a non-limiting example, however, and other diazide monomers may be used. In some aspects, the $R_2$ group of formula XI is a

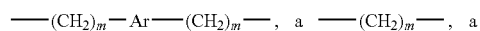

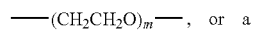

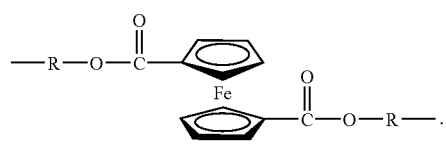

In some aspects, the Ar group is a

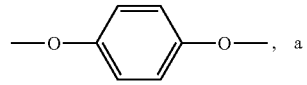

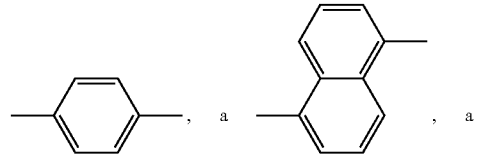

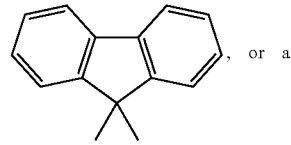

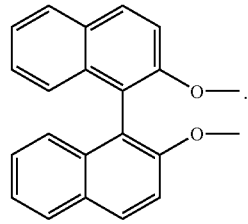

In some aspects, the R group is hydrogen, an alkyl, a vinyl, an acetyl, an aryl, or a heteroaryl. In some aspects, m≧1. These are non-limiting examples, however, and other groups may be used.

In some aspects, the aroyldiacetylene monomer used in the synthesis of the linear poly(aroyltriazole) has formula XII:

(XII)

This is a non-limiting example, however, and other aroyldiacetylene monomers may be used. In some aspects, the $R_4$ group of formula XII is a

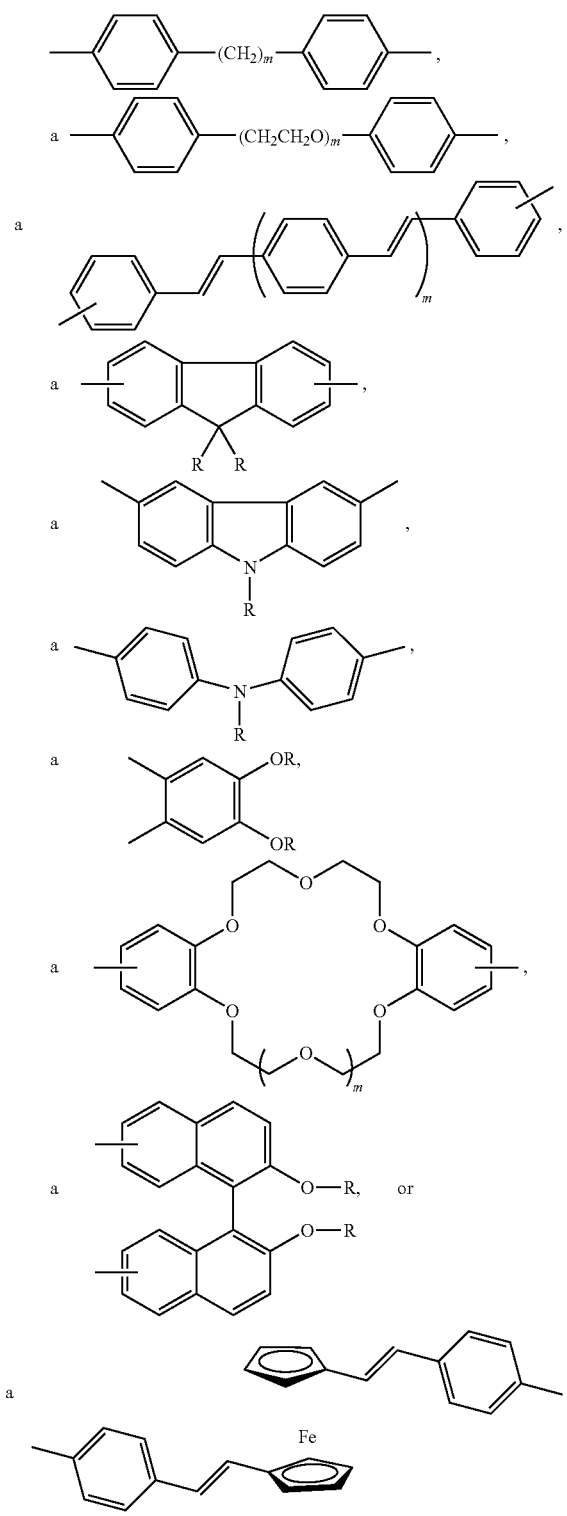

In some aspects, the R group is hydrogen, an alkyl, a vinyl, an acetyl, an aryl or a heteroaryl. In some aspects, m≧1. These are non-limiting examples, however, and other groups may be used.

In some aspects, the organic solvent used in the synthesis of the polytriazoles is selected from 1,4-dioxane, dimethylformamide and toluene. These are non-limiting examples, however, and other organic solvents may be used.

In some aspects, the polymerization of the hyperbranched polytriazoles occurs within a time range of about 70 hours to about 90 hours, or from a range of about 82 to about 88 hours. These are non-limiting examples, however, and other ranges may be used.

In some aspects, the polymerization of the hyperbranched poly(aroyltriazoles) and the linear poly(aroyltriazoles) occurs within a time range of about 4 hours to about 6 hours, more particularly about 5 hours. This is a non-limiting example, however, and other ranges may be used.

DETAILED DESCRIPTION

The present disclosure includes a process of producing novel readily soluble hyperbranched polytriazoles by 1,3-dipolar cycloaddition. The soluble hyperbranched polytriazoles are constructed by diazides and triynes or diacetylenes and triazides monomers. When aroyldiacetylenes are reacted under metal-free 1,3-dipolar cycloaddition conditions with di- or tri-azide monomers, highly regioselective linear and hyperbranched poly(aroyltriazole)s can be achieved in excellent yields and with high molecular weights. The separated acetylene and azide monomers efficiently prohibit undesired self-polymerization during monomer preparation and storage.

The present disclosure includes a process of preparing soluble, and therefore processible, hyperbranched poly(triazoles) and poly(aroyltriazoles) as shown in Schemes (i) and (ii) as well as linear poly(aroyltriazoles) from diacetylenes and diazides as shown in Scheme (iii).

(1)

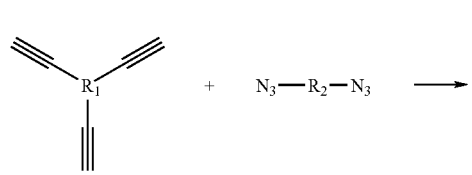

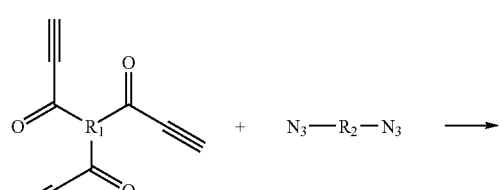

(2)

$R_1 =$

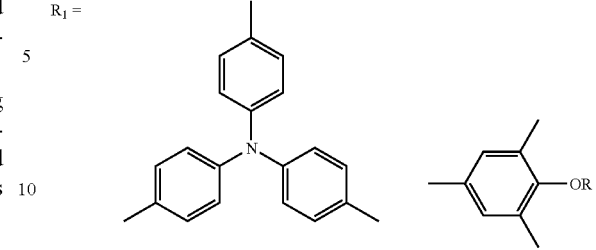

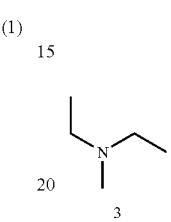

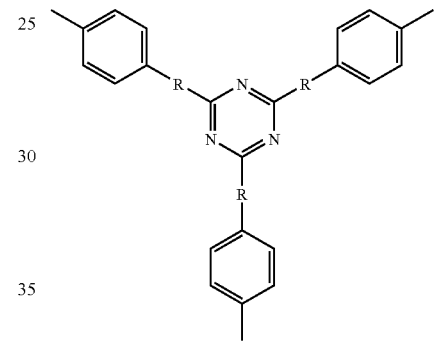

$R_2 =$

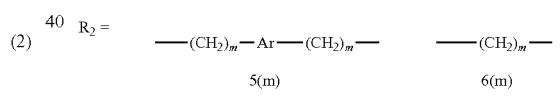

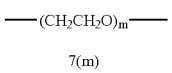

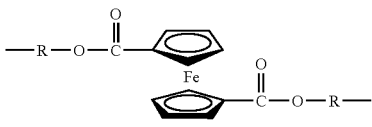

$Ar =$

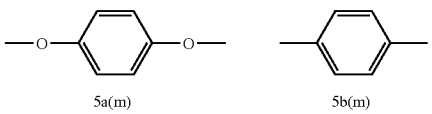

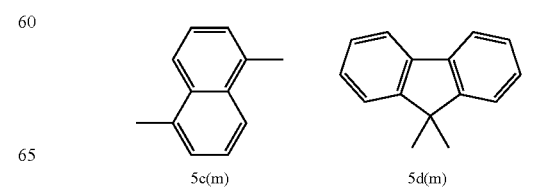

-continued
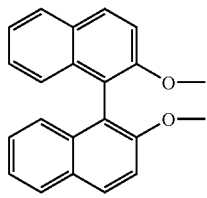
5e(m)
(i)
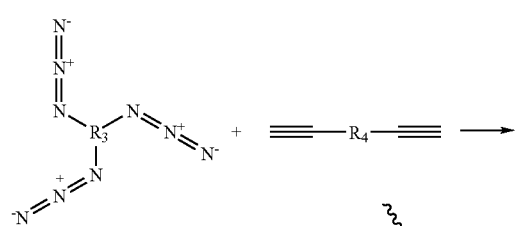
(3)
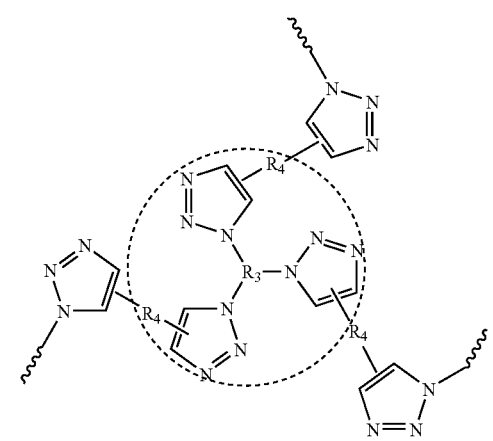
(4)
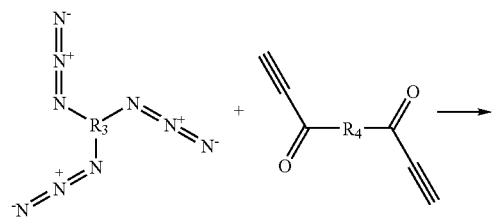
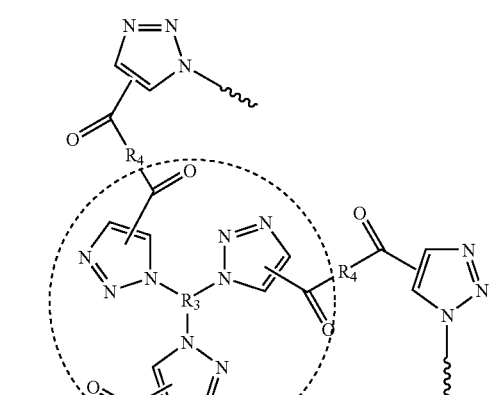
-continued
$R_3 =$
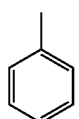
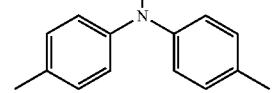
(ii)
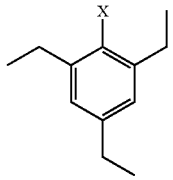
9
10
11
$R_4 =$
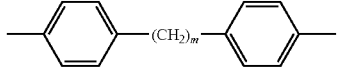
12(m)
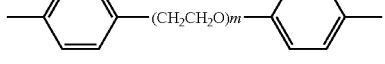
13(m)
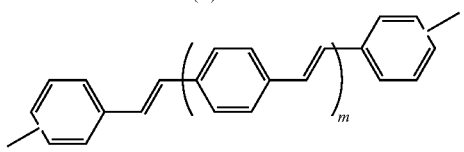
14(m)
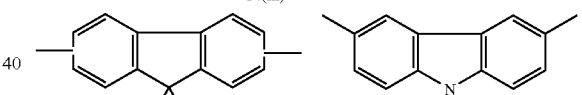
15   16
17   18
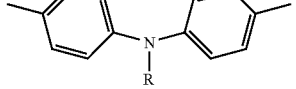
19(m)
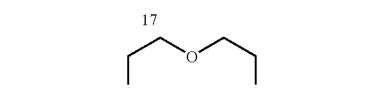
20

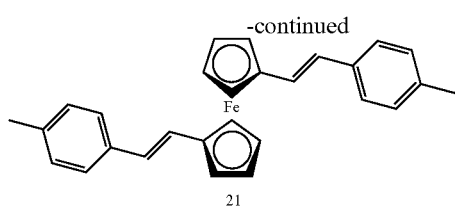

21

(iii)

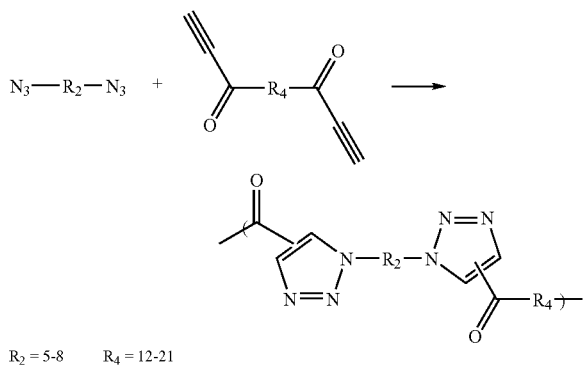

(5)

$R_2 = 5-8 \quad R_4 = 12-21$ where R represents a proton (R=H) or any organic groups (e.g. R=alkyl, vinyl, acetyl, aryl, heteroaryl), and $m \geq 1$. X presents a proton (X=H), or any organic groups (e.g. X=alkyl, vinyl, acetyl, aryl, heteroaryl), or halogen atom (X=F, Cl, Br, I).

This subject matter is not limited to the monomer and polymer structures listed in schemes (i)-(iii). However, acetylene, especially the aroylacetylene groups, are preferentially connected to aromatic or other conjugated structural units. The azide monomers can be conjugated and nonconjugated compounds.

Figure 1:
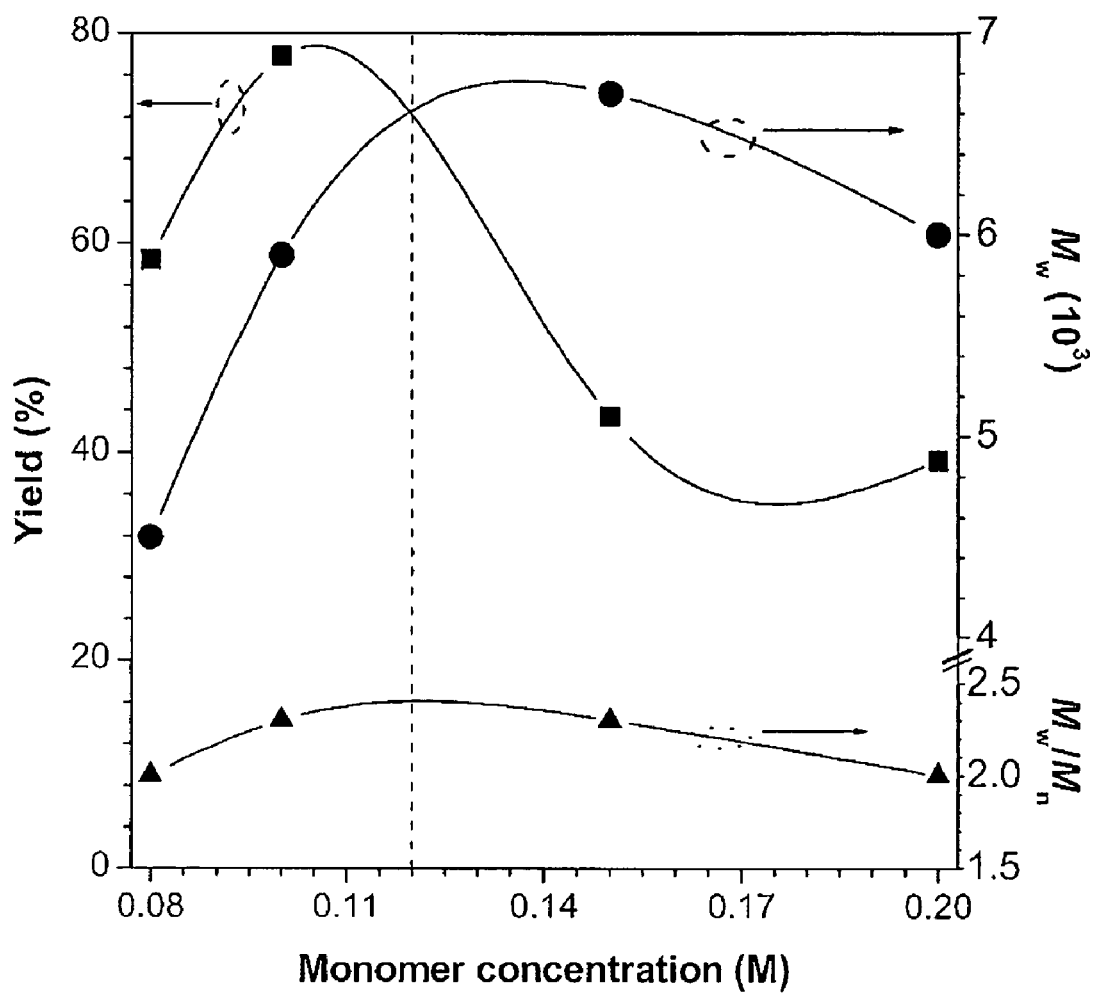
FIG. 1 shows the effect of monomer concentration [M] on the 1,3-dipolar cycloaddition of tris(4-ethynylphenyl)amine and 1,4-bis(4-azidobutoxy)benzene in 1,4-dioxane under reflux for 72 hours; the molar ratio of triyne and diazide is 2:3.
Figure 2:
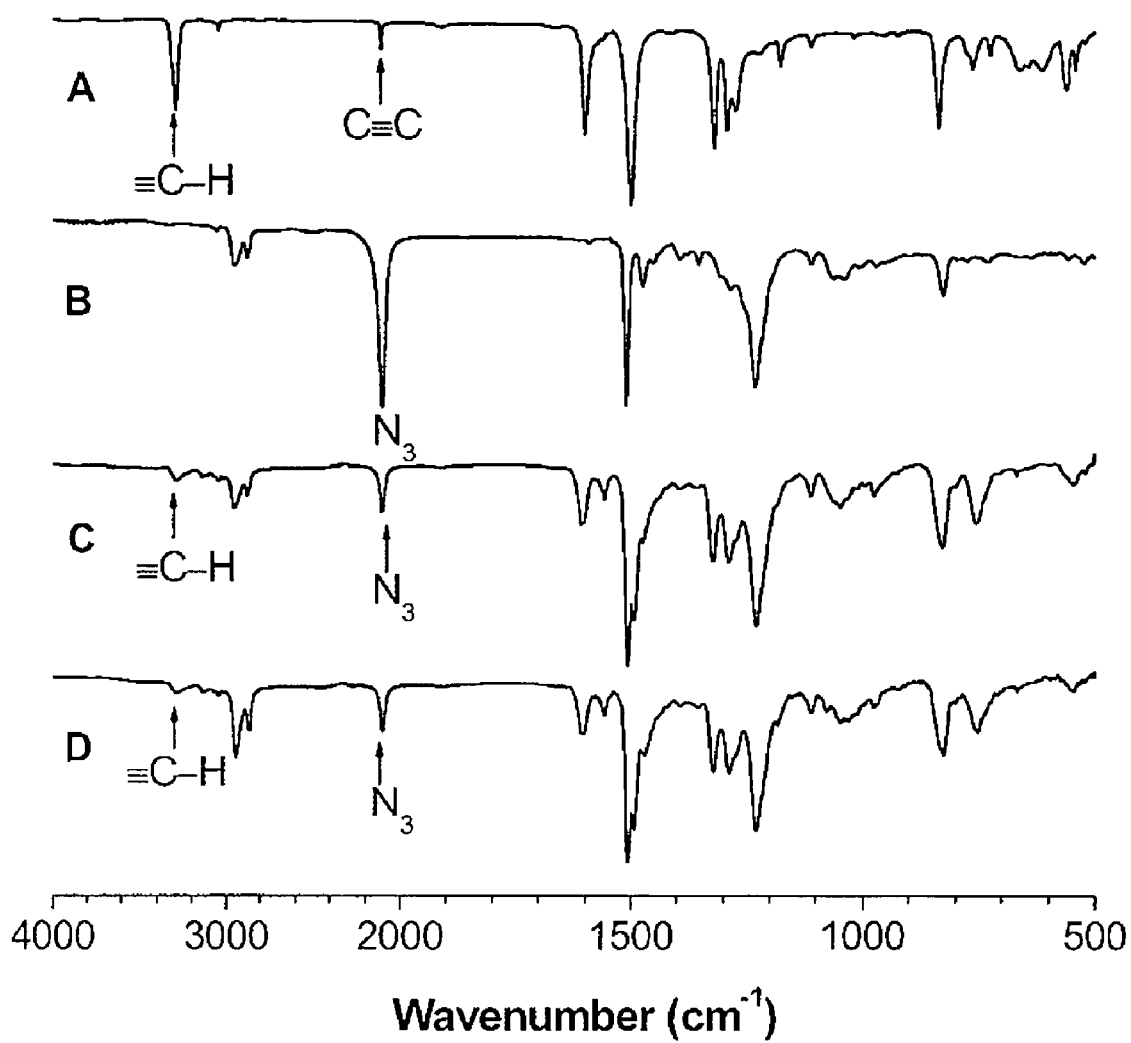
FIG. 2 shows the IR spectra of monomers (A) tris(4-ethynylphenyl)amine and (B) 1,4-bis(4-azidobutoxy)benzene and their hyperbranched polymers (C) PI and (D) PII.
Figure 3:
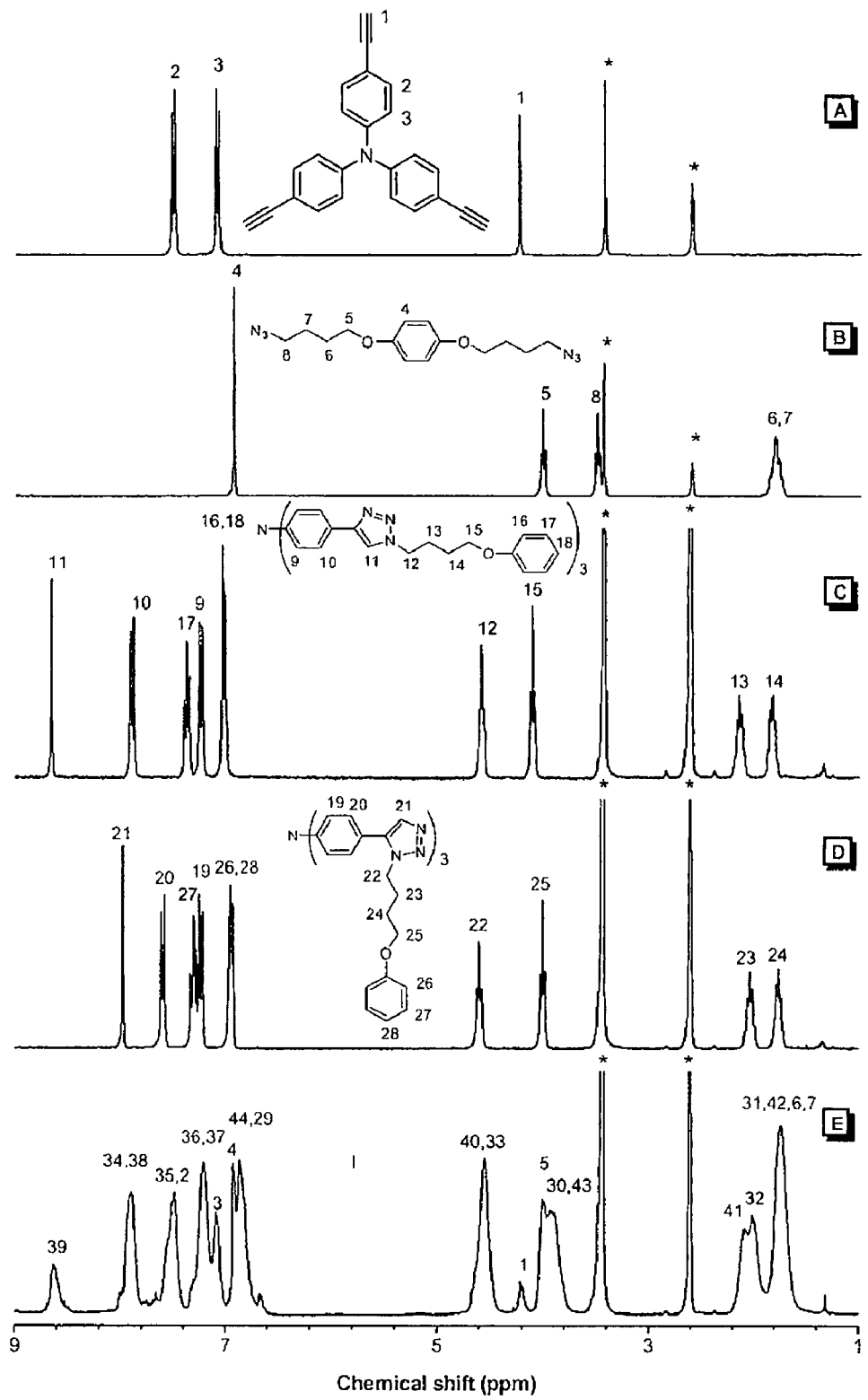
FIG. 3 shows the $^1$H NMR spectra of monomers (A) tris (4-ethynylphenyl)amine and (B) 1,4-bis(4-azidobutoxy)benzene, model compounds (C) tris(4-(1-(4-phenoxybutyl)-1H-1,2,3-triazol-4-yl)phenyl)amine and (D) tris(4-(3-(4-phenoxybutyl)-3H-1,2,3-triazol-4-yl)phenyl)amine, and (E) hyperbranched polymer PI in DMSO-$d_6$. The solvent and water peaks are marked with asterisks (*).
Figure 4:
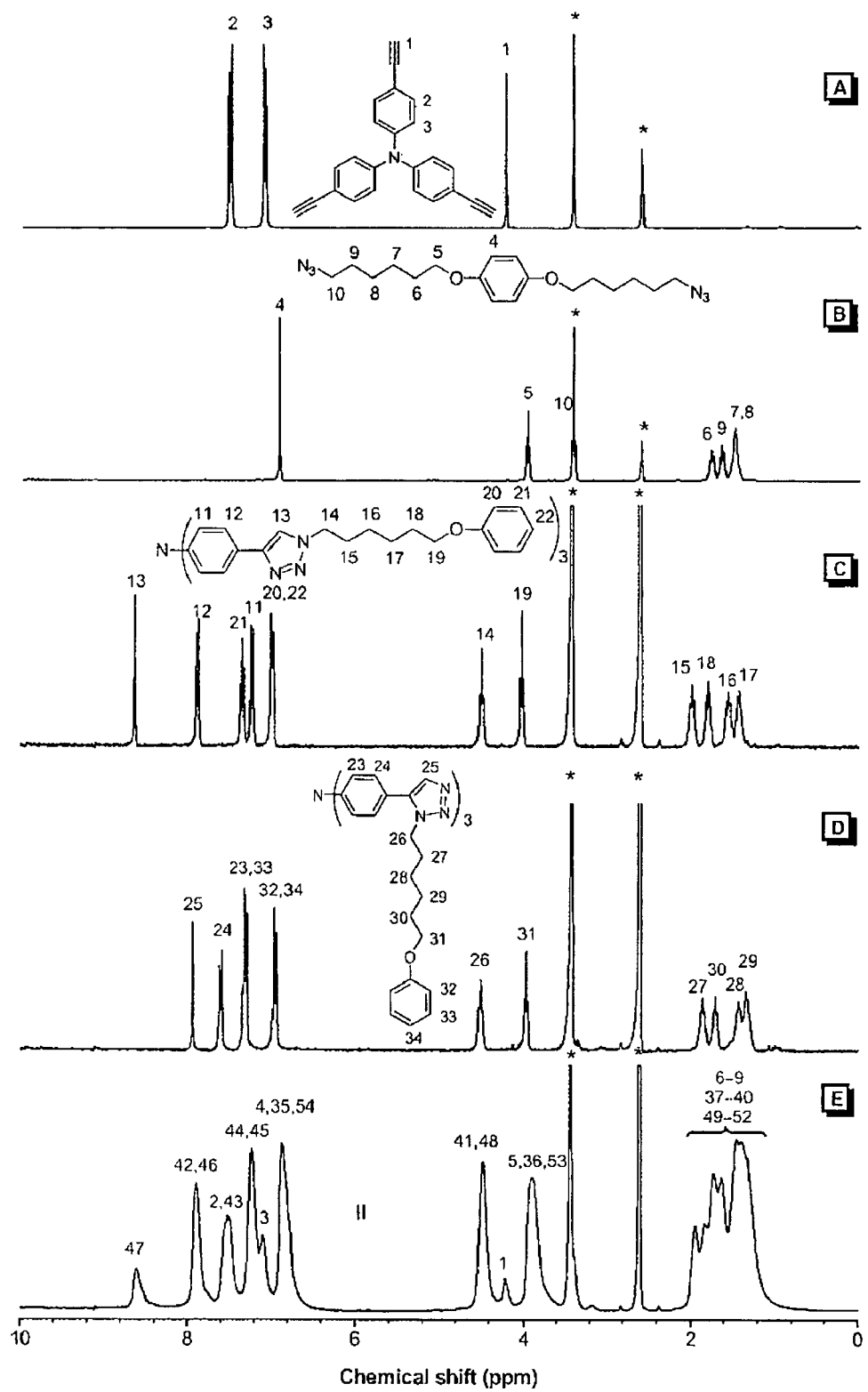
FIG. 4 shows the $^1$H NMR spectra of monomers (A) tris (4-ethynylphenyl)amine and (B) 1,4-bis(6-azidohexyloxy) benzene, model compounds (C) tris(4-(1-(6-phenoxyhexyl)-1H-1,2,3-triazol-4-yl)phenyl)amine and (D) tris(4-(3-(6-phenoxyhexyl)-3H-1,2,3-triazol-4-yl)phenyl)amine, and (E) hyperbranched polymer PII in DMSO-$d_6$. The solvent and water peaks are marked with asterisks (*)
Figure 5:
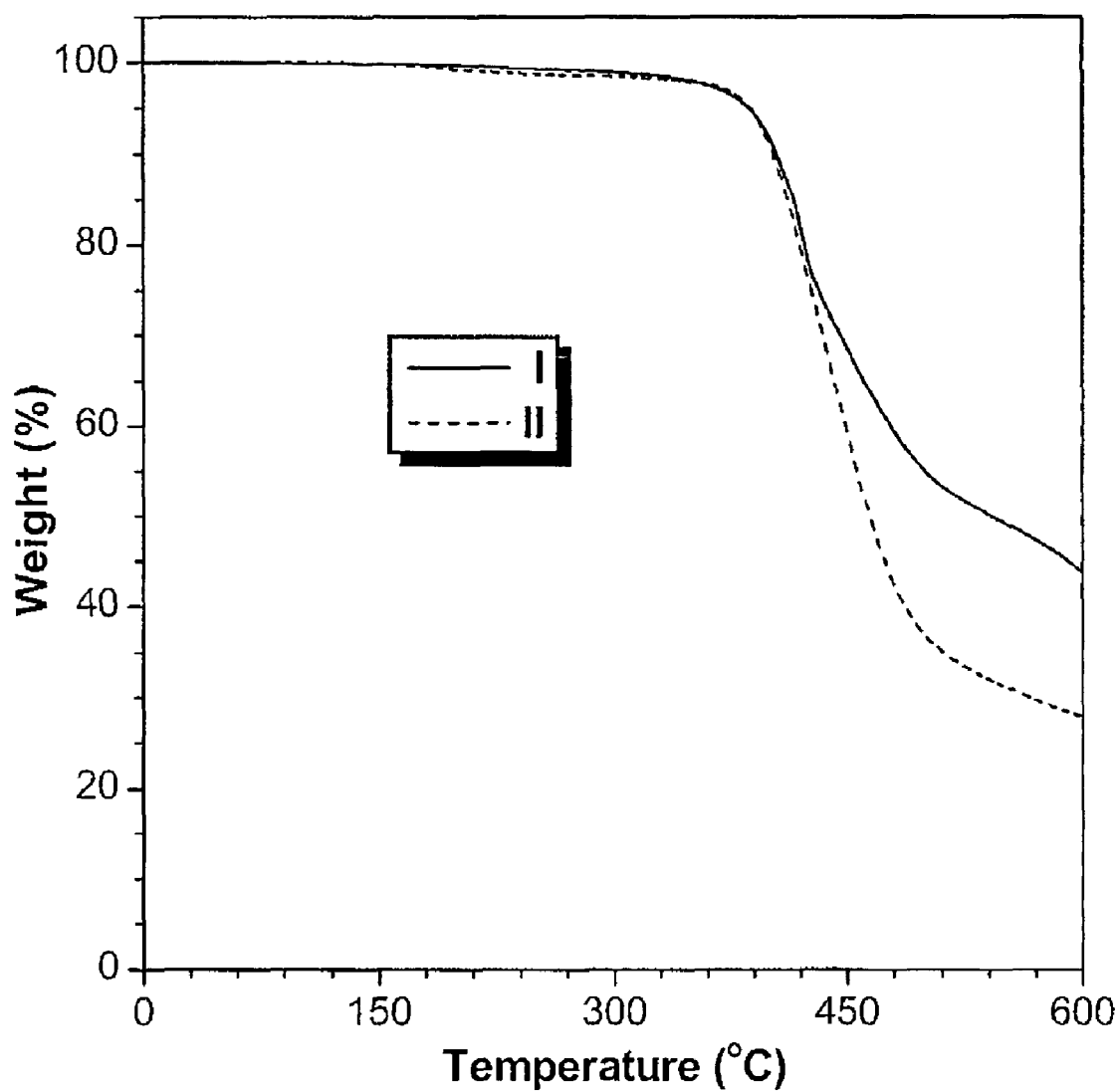
FIG. 5 shows the TGA thermographs of hyperbranched polymers PI and PII recorded under nitrogen at a heating rate of 20° C./min.
Figure 6:
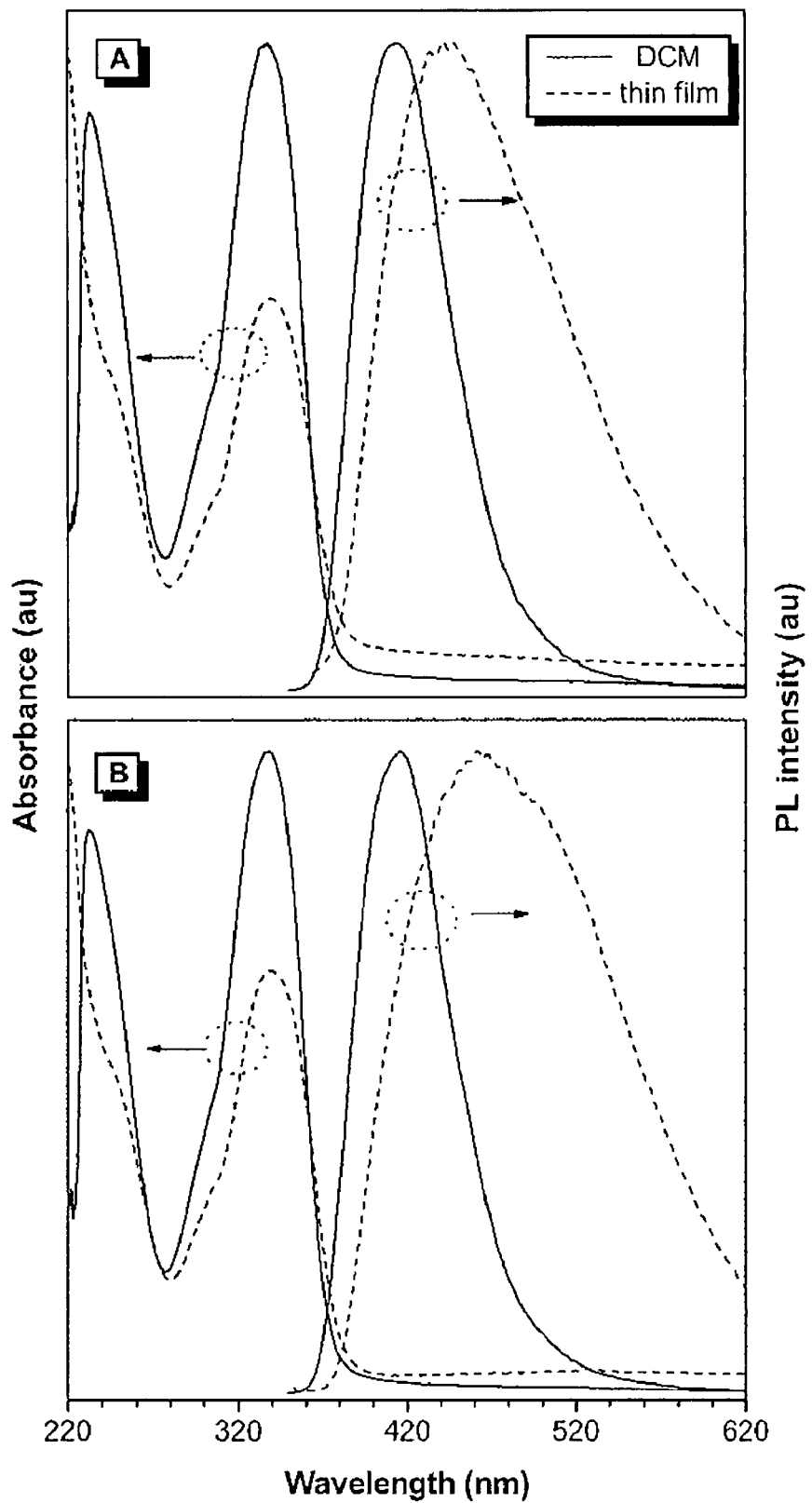
FIG. 6 shows the absorption and emission spectra of DCM solutions (~1.5×10$^{-3}$ mg/mL) and thin solid films of (A) PI and (B) PII. Excitation wavelength: 337 nm (DCM) and 340 (film).

One objective of this subject matter is to prepare functional hyperbranched polytriazoles by 1,3-dipolar cycloaddition reaction with functional monomers of azides and acetylenes in an optimized reaction condition (FIG. 1). This method employs a strategy of separated azides and acetylenes functionalities in order to avoid undesired self-polymerization during monomer synthesis and storage. The obtained hyperbranched polytriazoles are readily soluble in common organic solvents, such as chloroform, tetrahydrofuran and dichloromethane. The obtained hyperbranched polytriazoles possess both azide and acetylene periphery as observed from their IR spectra (FIG. 2). The ratio of 1,4- and 1,5-disubstituted 1,2,3-triazole are calculated from their proton NMR comparing with that of their model compounds (FIG. 3 and FIG. 4). The obtained hyperbranched polytriazoles also have high thermal stabilities (FIG. 5) and can emit light upon excitation (FIG. 6). The polymers can be crosslinked by thermal and radiation methods. It is possible to take advantage of the crosslinkable properties of the unreacted azide groups on the periphery of the polymers. UV irradiation, through a negative mask and followed by dissolution of the unexposed materials, can generate light emissive patterns and thus, make the polymers ideal candidates for the application in the manufacture of integrated circuits and other high-tech utilities.

Furthermore, aroylacetylenes react with azides to produce highly regioselective linear and hyperbranched poly(aroyltriazole)s. The regioselectivity of the 1,4- and 1,5-disubstituted 1,2,3-triazoles (>9:1) is much higher than the normal ratio (1:1) obtained from conventional thermal 1,3-dipolar cycloaddition (Huisgen, R. In 1,3-*Dipolar Cycloaddition Chemistry*; Padwa, A., Ed.; Wiley: New York, 1984)). There are three main features of this type of cycloaddition: (1) it requires a short reaction time, (2) it does not require strict experimental precautions in order to exclude oxygen and moisture from the reaction mixture, and (3) this reaction is a metal-free catalyzed system, which renders it environmental friendly, economically and without any catalyst residues left inside the polymer.

All the obtained polytriazoles exhibit interesting optical and thermal properties, which can be readily tuned by incorporating of functional features such as various types of chromophores into the linear and hyperbranched poly(aroyl)triazole structures. Such polymers may be useful as electro-optical materials.

This subject matter is concerned with two types of structural polymers, one of which are hyperbranched polytriazoles constructed from triyne and diazide monomers or triazide and diacetylene monomers, and the others are linear and hyperbranched poly(aroyltriazoles) prepared from the respective di- and tri-functionalized monomers.

The first part of this subject matter, the thermal 1,3-dipolar cycloaddition between triynes and diazides or triazides and diacetylenes can achieve soluble and processible hyperbranched polytriazoles with high yields (up to 75.7%) and molecular weights up to 20,000 Daltons under optimized reaction conditions, such as the comonomer ratios, monomer concentrations, reaction time, and reaction temperature. Upon UV excitation, the polymers PI and PII (Chart 1) can emit strong blue lights with high quantum yields in dichloromethane (the data are listed in Table 1). Further, the polytriazoles with strong acceptor units such as the 1,2,3-triazoles are potential candidates for electron transporting materials in electronic devices.

According to the proposed mechanism of this reaction, the second part of this subject matter is to capture the intermediates by reacting with more active azides compounds. A highly regioselective product is thus obtained when 1-phenylprop-2-yn-1-one is reacted with 1-(azidomethyl)benzene as a model reaction. The ratio of 1,4- and 1,5-disubstituted 1,2,3-triazole is determined larger than 10/1. The isolated yield of 1,4-disubstituted 1,2,3-triazole compound is as high as 90.5%. The aroylacetylenes have some advantages over the pure acetylenes: shorter reaction time (4-6 h), higher regioselectivity and higher conversion of the monomers and, consequently, higher yield of the resulting polymers. Furthermore, this reaction does not require any precautions to exclude moisture or oxygen as other synthetic protocols for click chemistry. Different aroyldiacetylenes were treated with different diazides in a DMF/toluene solvent mixture. Delightfully, readily soluble linear poly(aroyltriazoles) are obtained in high yields (up to 92%) and with high molecular weight (the data are listed in Table 3). From the proton NMR spectra, the ratio of 1,4- to 1,5-disubstituted 1,2,3-triazole inside the polymers are all deduced to about 9/1.

Figure 7:
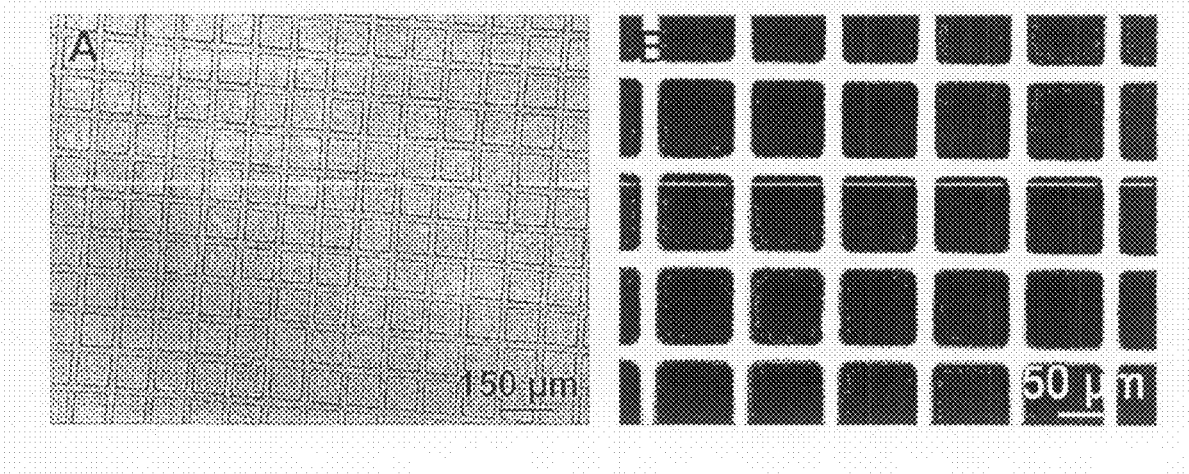
FIG. 7 shows photoresist patterns generated by photo-cross-linking of PI for 5 min in air; images taken under (A) normal room lighting and (B) UV lamp illumination.

The luminescent polymers contain numerous of these functionalities on the periphery and thus were utilized for the fabrication of photoresist patterns. The polymers cross-link upon irradiation in air. After washing away the unexposed part, well-resolved 3-dimensional patterns were generated (FIG. 7A). When observed under fluorescence optical microscope, white light patterns were obtained at excitation wavelengths of 330-385 nm (FIG. 7B). The white emission can be attributed to the broad fluorescence spectrum of the cross-linked product.

Figure 8:
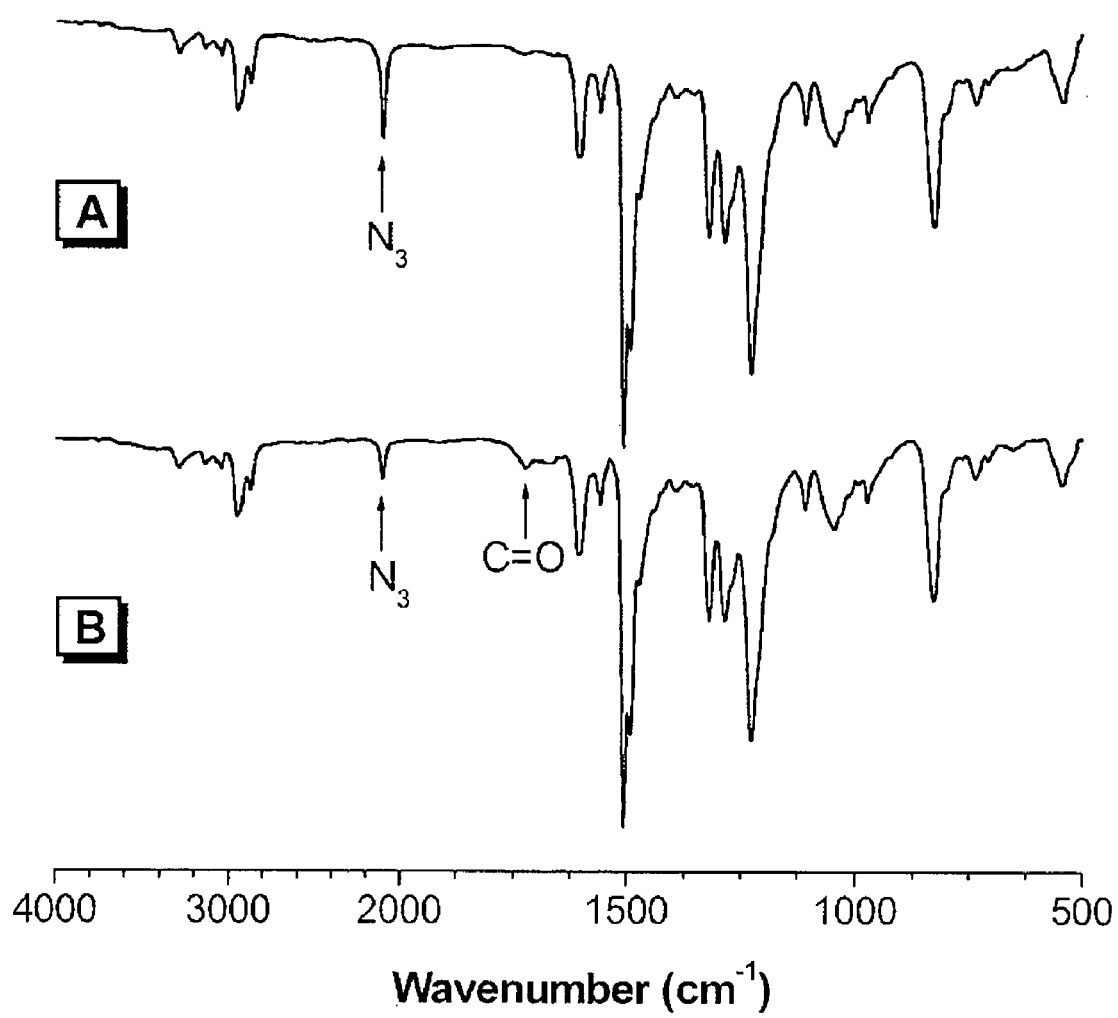
FIG. 8 shows the IR spectra of PI (A) before and (B) after UV irradiation for 5 min.
Figure 9:
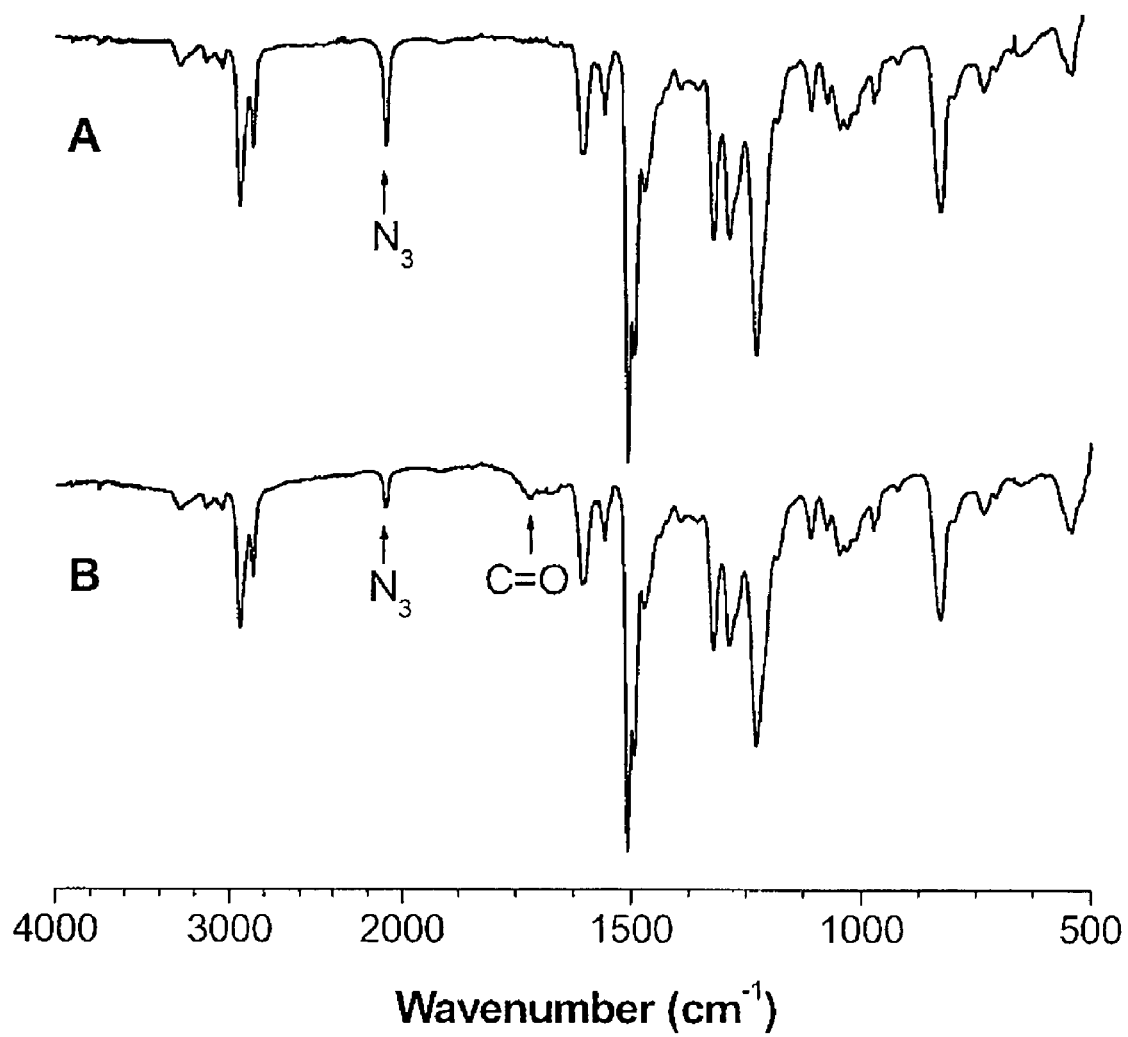
FIG. 9 shows the IR spectra of PII (A) before and (B) after UV irradiation for 5 min.
Figure 10:
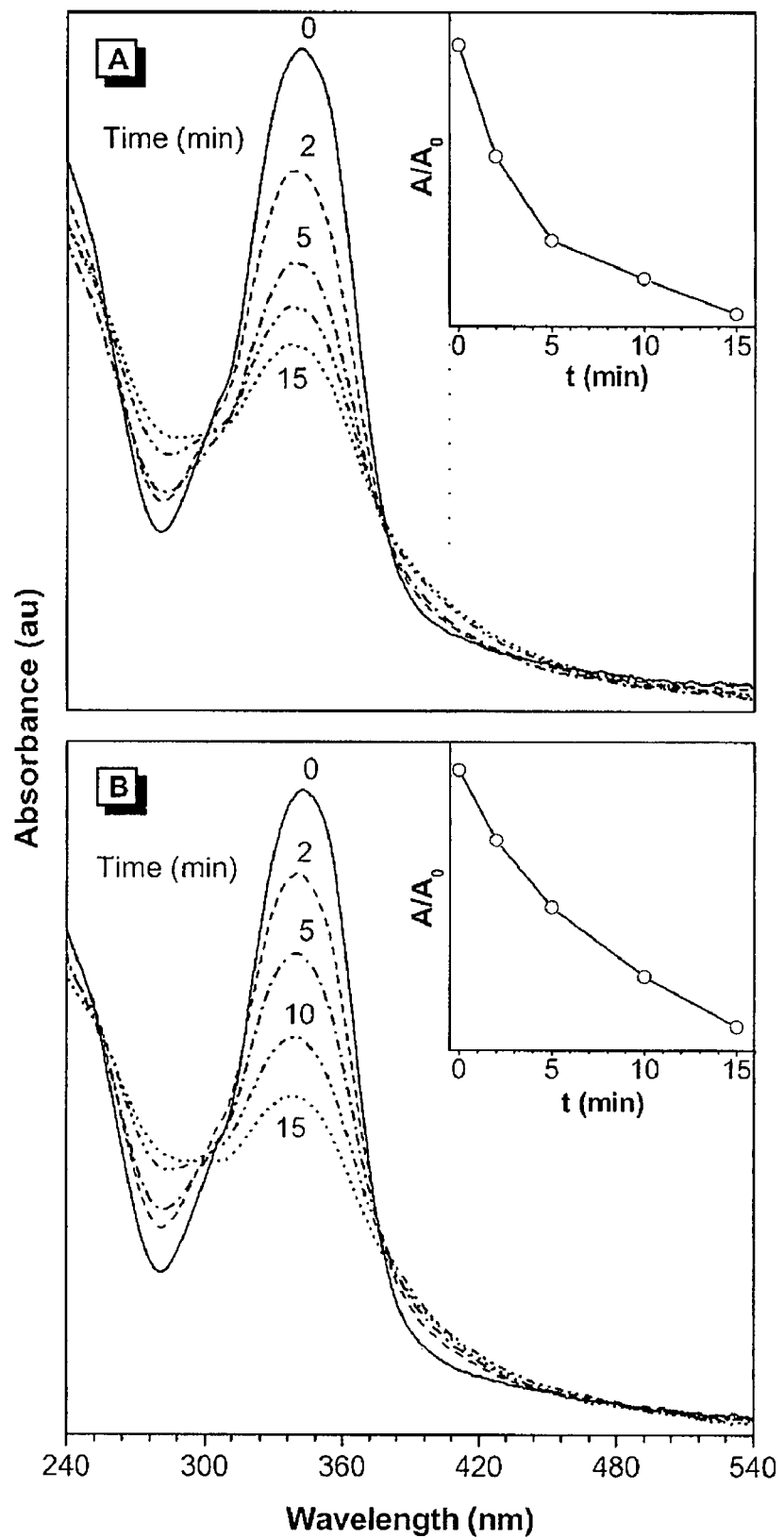
FIG. 10 shows the change of absorption spectra of (A) PI and (B) PII with time of UV irradiation (365 nm). Insert: plot of $A/A_0$ of (A) PI and (B) PII at ~340 nm with irradiation time (t) (Ao=Absorbance intensity at 0 min).
Figure 11:
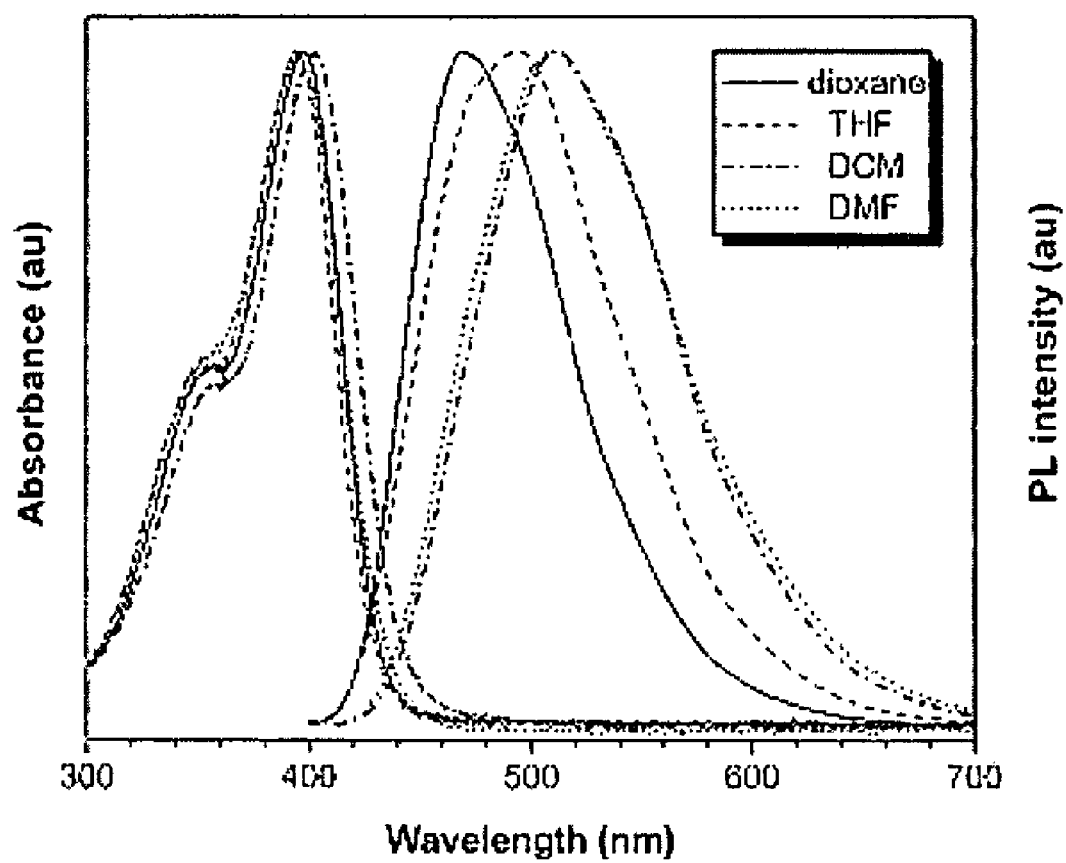
FIG. 11 shows the UV and PL spectra of polymer PXII in different polar solvents (conc. 5.4 μg/mL). Excitation wavelength: 390 nm.

The cross-linking mechanism was investigated by UV and IR spectroscopies. The UV spectra of PI and PII exhibit a peak at ~340 nm associated with the π-π* transitions of tris(4-triazolylphenyl)amine chromophores (FIG. 10). Their intensities decrease progressively with irradiation time, suggesting that part of the triazole rings of the polymer is opened. FIGS. 8 and 9 show the IR spectra of the polymer films before and after UV irradiation. After the experiment, the azide absorption becomes weaker and a new broad peak, which can be assigned to the carbonyl group stretching vibration, appears at 1720 $cm^{-1}$. This means that a fraction of the polymer chains is photo-oxidized. Thus, the mechanism can be proposed as follows: the azides groups are first decomposed upon UV irradiation and then crosslink with triazoles moieties, then part of the triazoles are oxidized after the ring-open.

Additionally, organometallic polytriazoles are easily obtained when the metal containing azido monomers or aroylacetylene monomers are reacted with aroylacetylenes or azido monomers, respectively, which will serve as precursors for magnetic ceramics when pyrolyzed at elevated temperatures.

Furthermore, the hyperbranched polytriazoles may act as fluorescent adhesive materials with large tensile strength between two metals, such as copper, iron, or alumina. These are non-limiting examples, however, and other metals may be used.

EXAMPLE 1

Hyperbranched Polytriazole Constructed from tris(4-ethynylphenyl)amine and 1,4-bis(4-azidobutoxy)benzene (PI)

Into a 20 mL Schlenk tube with a stopcock in the sidearm were added tris(4-ethynylphenyl)amine (0.126 g, 0.4 mmol) and 1,4-bis(4-azidobutoxy)benzene (0.183 g, 0.6 mmol). The tube was evacuated and refilled with nitrogen three times through the side arm. Then freshly distilled 1,4-dioxane (3.5 mL) was injected. The mixture was refluxed for 72 h. After cooled down to room temperature, the solution was diluted with small amount of chloroform and then added dropwise to 300 mL hexane/chloroform mixture (10:1, v/v) through a cotton filter under stirring. The precipitation was collected and dried to constant weight in vacuum.

Characterization data: Yellow powder; yield: 64.0%. $M_w$ 5500; $M_w/M_n$ 2.0 (GPC, polystyrene calibration). 1,4-disubstituted 1,2,3-triazole content (53%). IR (KBr), ν ($cm^{-1}$): 3283, 2097, 1606, 1557, 1506, 1227, 825. $^1$H NMR (300 MHz, DMSO-$d_6$), δ (ppm): 8.63, 8.00, 7.48, 7.21, 7.09, 6.93, 6.87, 4.54, 4.21, 4.00, 3.92, 2.08, 2.01, 1.74. $^{13}$C NMR (75 MHz, DMSO-$d_6$), δ (ppm): 152.5, 145.9, 136.9, 133.1, 132.5, 129.7, 127.0, 126.5, 125.5, 124.8, 123.8, 123.4, 122.6, 121.0, 115.2, 83.4, 80.1, 67.1, 50.4, 49.3, 47.5, 26.5, 26.2, 26.0, 25.8, 25.6, 25.1, 24.7. Elem. Anal.: calcd (%): C, 70.65; H, 6.27; N: 15.84. Found (%): C, 70.46; H, 5.79; N: 17.28.

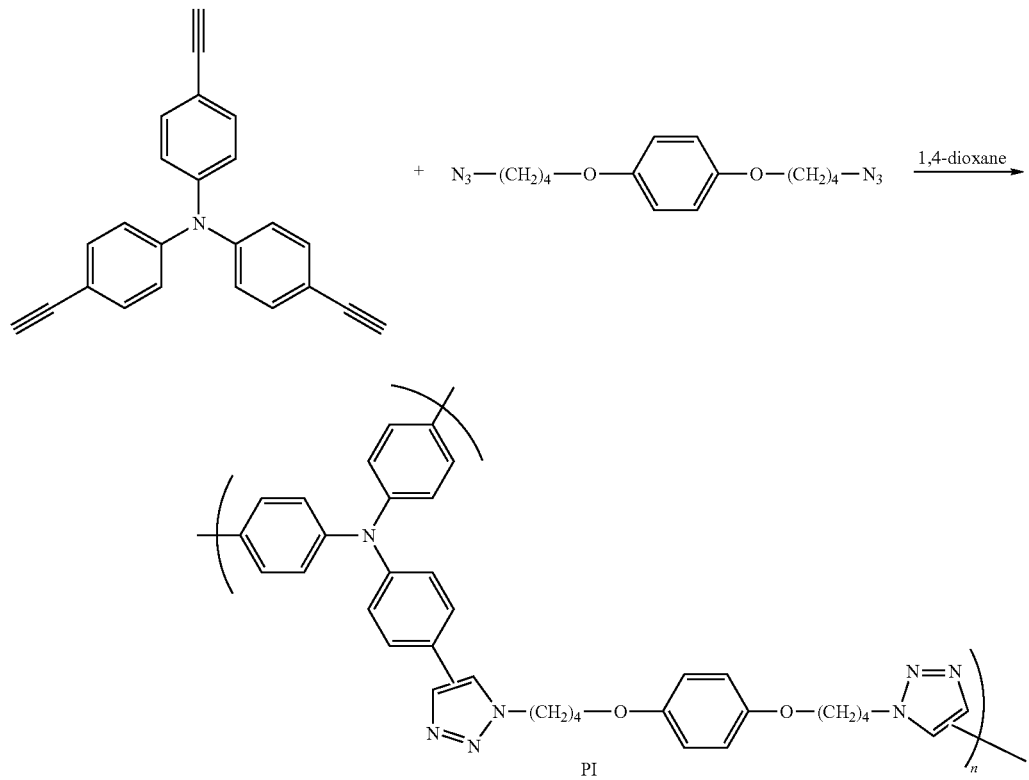

EXAMPLE 2

Hyperbranched Polytriazole by 1,3-dipolar Cycloaddition of tris(4-ethynylphenyl)amine and 1,4-Bis(6-azidohexyloxy)benzene (PII)

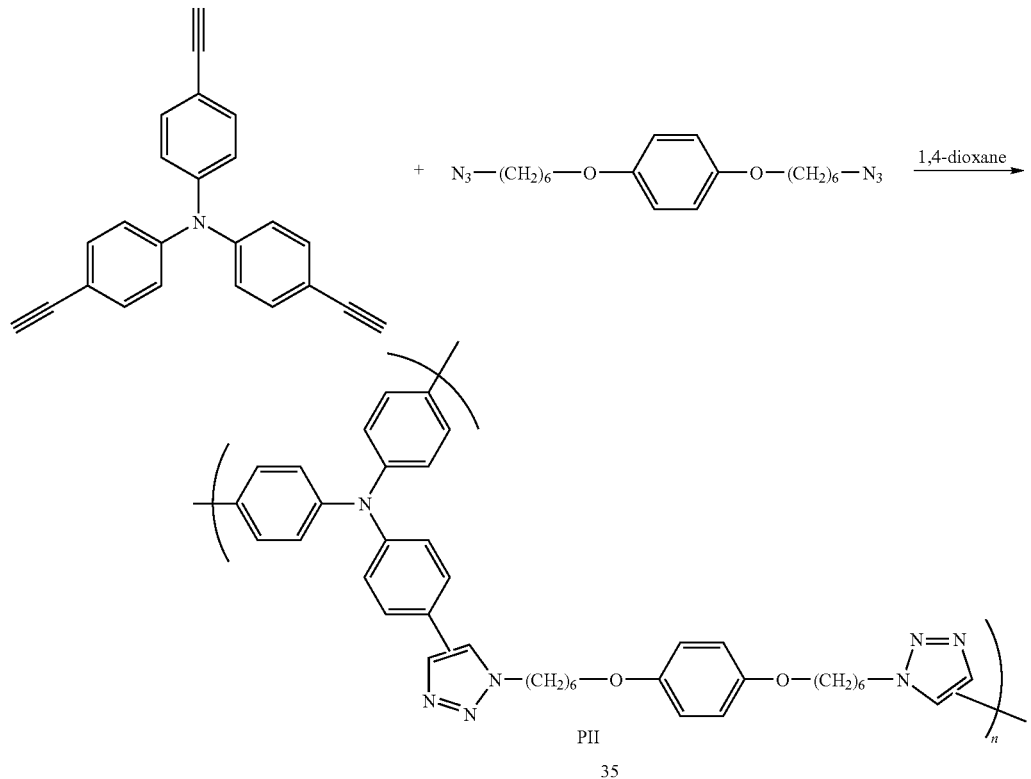

This hyperbranched polytriazole was carried out in accordance with the same procedure as described in Example 1 with tris(4-ethynylphenyl)amine (0.126 g, 0.4 mmol) and 1,4-bis(4-azidobutoxy)benzene (0.216 g, 0.6 mmol).

Characterization data: Yellow powder; yield: 75.7%. $M_w$ 11400; $M_w/M_n$ 2.7 (GPC, polystyrene calibration). 1,4-disubstituted 1,2,3-triazole content (50%). IR (KBr), ν (cm$^{-1}$): 3286, 2095, 1601, 1556, 1506, 1491, 1228, 824. $^1$H NMR (300 MHz, DMSO-d$_6$), δ (ppm): 8.60, 7.89, 7.51, 7.23, 7.09, 6.86, 4.47, 4.21, 3.88, 1.95, 1.83, 1.72, 1.63, 1.45, 1.39, 1.32. $^{13}$C NMR (75 MHz, DMSO-d$_6$), δ (ppm): 152.5, 147.4, 146.7, 146.0, 136.7, 132.7, 132.3, 129.2, 126.5, 126.4, 125.0, 124.5, 124.3, 123.8, 123.2, 123.0, 122.8, 118.6, 115.0, 82.9, 67.8, 56.3, 50.8, 49.7, 47.6, 29.7, 29.4, 28.6, 28.5, 28.2, 25.9, 25.7, 25.1, 24.9. Elem. Anal.: Calcd (%): C, 72.33; H, 7.18; N: 14.06. Found (%): C, 72.18; H, 6.42; N: 16.05.

EXAMPLE 3

Hyperbranched Polytriazole by Polymerization of 1,3,5-triethynyl-2-(hexyloxy)benzene and 1,4-bis(4-azidobutoxy)benzene (PIII)

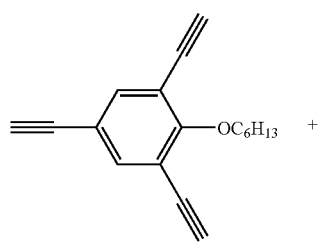

This hyperbranched polymer was carried out in accordance with the same procedure as described in Example 1 with 1,3,5-triethynyl-2-(hexyloxy)benzene (0.125, 0.5 mmol) and 1,4-bis(4-azidobutoxy)benzene (0.228 g, 0.75 mmol).

Characterization data: Orange power, yield: 47.9%. $M_w$ 10600; $M_w/M_n$ 2.7 (GPC, polystyrene calibration).

EXAMPLE 4

Hyperbranched Polytriazole by Polymerization of 1,3,5-triethynyl-2-(hexyloxy)benzene and 1,4-bis(6-azidohexyloxy)benzene (PIV)

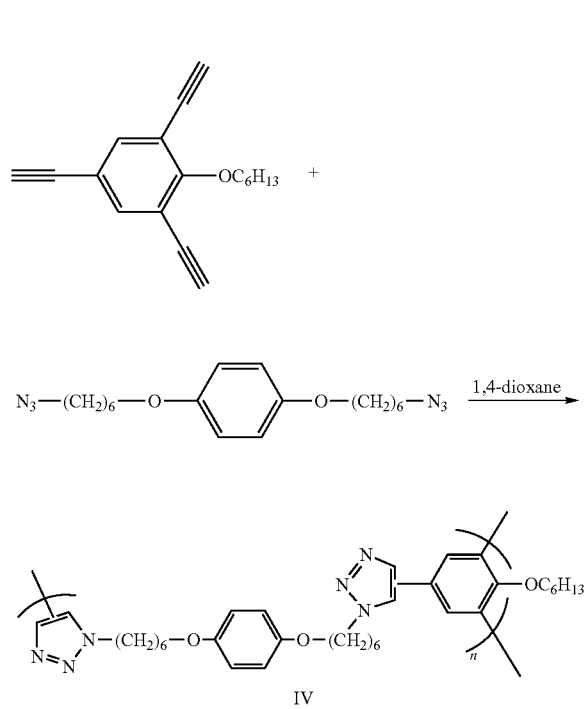

IV

This hyperbranched polymer was carried out in accordance with the same procedure as described in Example 1 with 1,3,5-triethynyl-2-(hexyloxy)benzene (0.125, 0.5 mmol) and 1,4-bis(6-azidohexyloxy)benzene (0.270 g, 0.75 mmol).

Characterization data: Orange power, yield: 62.8%. $M_w$ 23800; $M_w/M_n$ 4.3 (GPC, polystyrene calibration).

EXAMPLE 5

Hyperbranched Polytriazole by Polymerization of 1,3,5-triethynyl-2-(hexyloxy)benzene and 1,4-bis(azidomethyl)benzene (V)

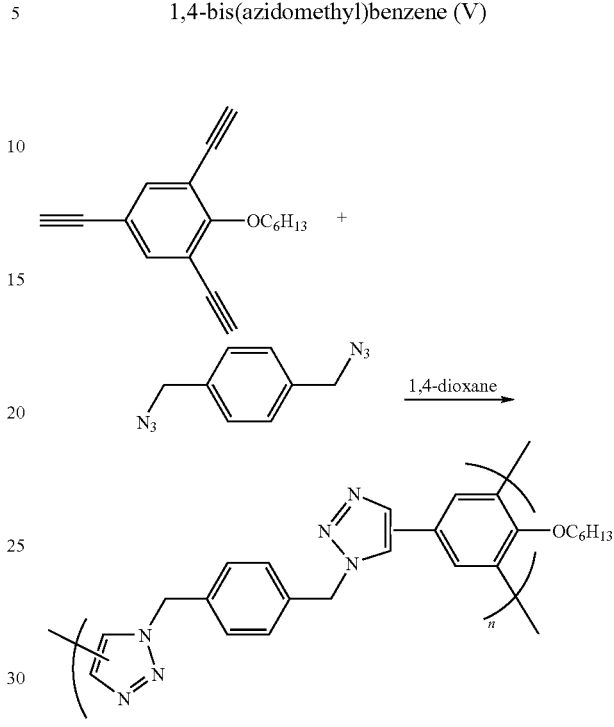

PV

This hyperbranched polymer was carried out in accordance with the same procedure as described in Example 1 with 1,3,5-triethynyl-2-(hexyloxy)benzene (0.050 g, 0.2 mmol) and 1,4-bis(azidomethyl)benzene (0.056 g, 0.3 mmol).

Characterization data: Orange power, yield: 71.7%. $M_w$ 7100; $M_w/M_n$ 3.2 (GPC, polystyrene calibration).

EXAMPLE 6

Polytriazole by Polymerization of 3,3'-(1,4-phenylenedimethoxy) bis(benzoylacetylene) with 1,4-bis(6-azidohexyloxy)benzene (PVI)

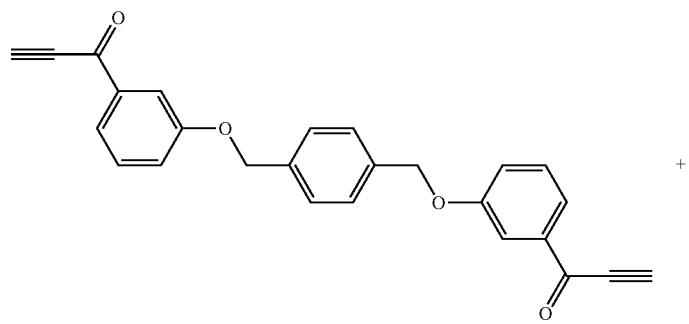

+

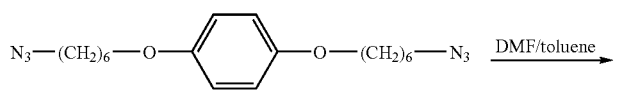

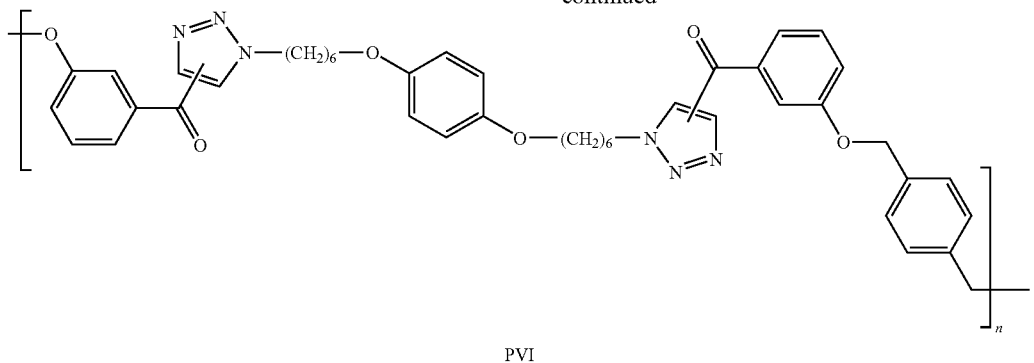

PVI 3,3'-(1,4-phenylenedimethoxy)bis(benzoylacetylene) (0.118 g, 0.3 mmol) and 1,4-bis(6-azidohexyloxy)benzene (0.108 g, 0.3 mmol) were added to a Schlenk tube, then 1 mL DMF and 1 mL toluene were added subsequently. After the monomers were totally dissolved and the solution became transparent, the mixture was heated up to 100° C. and reacted at that temperature for 6 h. The solution was then diluted with a small amount of chloroform and added dropwise into 200 mL hexane through a cotton filter under stirring. The precipitation was collected and dried to constant weight in vacuum.

Characterization data: Yellow powder, yield: 92.0%. $M_w$ 26700; $M_w/M_n$ 2.0 (GPC, polystyrene calibration). 1,4-disubstituted 1,2,3-triazole content (88.5%). $^1$H NMR (300 MHz, CDCl$_3$), δ (ppm): 8.23, 8.11, 8.03, 7.94, 7.48, 7.24, 6.78, 5.15, 4.75, 4.44, 3.87, 3.27, 1.99, 1.74, 1.43, 0.88. $^{13}$C NMR (75 MHz, CDCl$_3$), δ (ppm): 185.37, 158.82, 153.24, 148.19, 137.98, 136.70, 129.70, 128.46, 128.06, 123.94, 120.98, 115.80, 115.61, 70.18, 68.48, 50.87, 30.47, 29.46, 26.60, 25.94.

EXAMPLE 7

Polytriazole by Polymerization of 3,3'-(1,4-phenylenedimethoxy) bis(benzoylacetylene) with 1,4-bis(4-azidobutoxy)benzene (PVII)

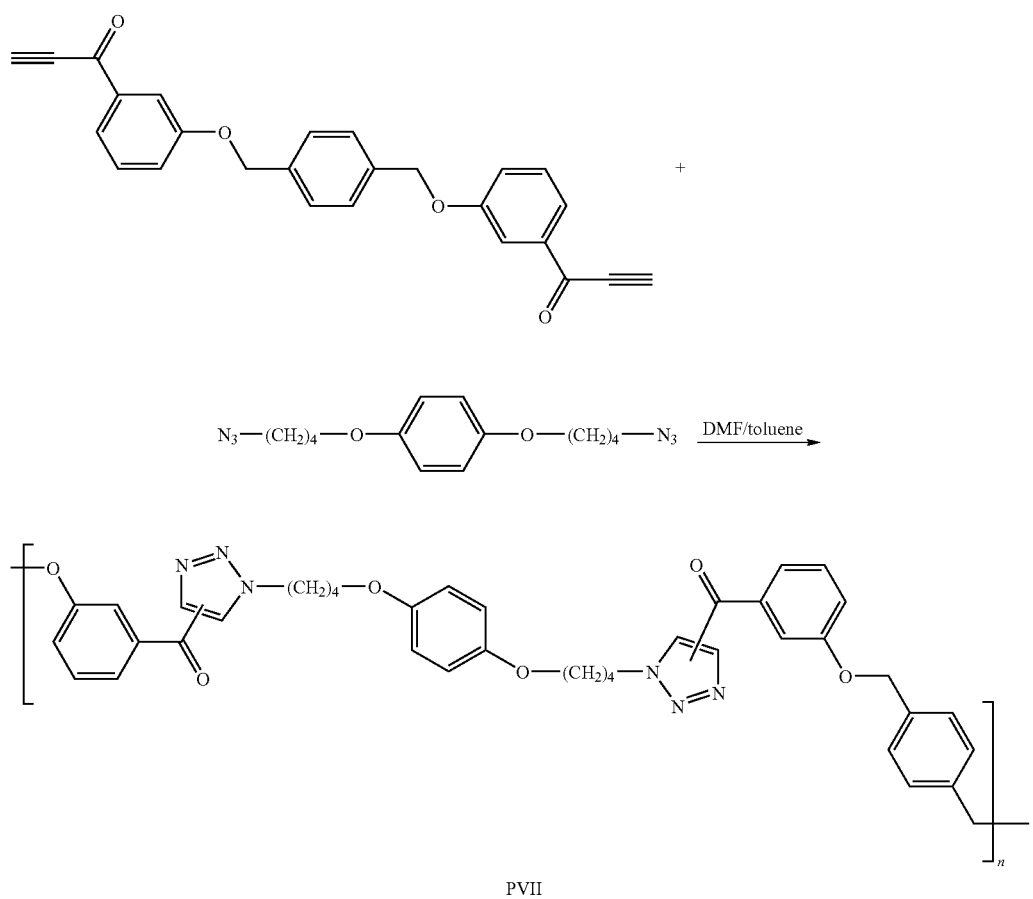

PVII

This polymer was carried out in accordance with the same procedure as described in Example 6 with 78.8 mg (0.2 mmol) of 3,3'-(1,4-phenylenedimethoxy) bis(benzoylacetylene) and 60.8 mg (0.2 mmol) of 1,4-bis(4-azidobutoxy)benzene in 0.6 mL DMF and 0.6 mL toluene mixture solvents.

Characterization data: white power, yield: 89.6%. $M_w$ 15900; $M_w/M_n$ 1.8 (GPC, polystyrene calibration). 1,4-disubstituted 1,2,3-triazole content (88.5%). $^1$H NMR (300 MHz, CDCl$_3$), δ (ppm): 8.26, 8.07, 8.02, 7.94, 7.47, 7.23, 6.78, 5.14, 4.81, 4.52, 3.93, 2.16, 1.80. $^{13}$C NMR (75 MHz, CDCl$_3$), δ (ppm): 185.03, 158.49, 152.78, 147.87, 137.66, 136.39, 129.40, 128.29, 127.75, 123.59, 120.67, 115.51, 115.31, 69.87, 67.40, 50.35, 27.28, 26.24.

EXAMPLE 8

Polytriazole by Polymerization of 3,3'-(1,6-hexylenedioxy)bis(benzoylacetylene) with 1,4-bis(6-azidohexyloxy)benzene (PVIII)

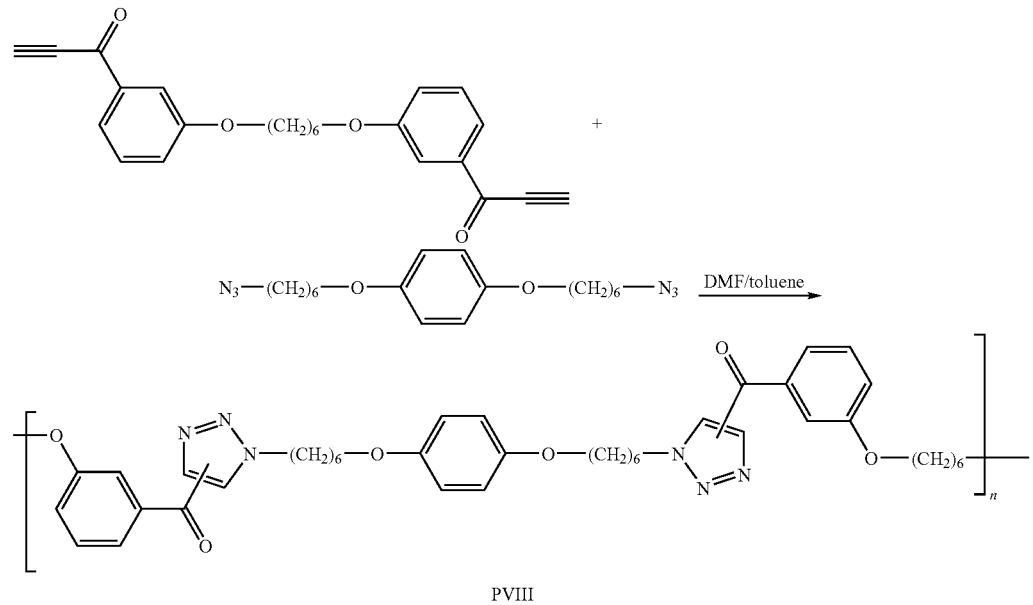

PVIII

This polymer was carried out in accordance with the same procedure as described in Example 6 with 0.112 g (0.3 mmol) of 3,3'-(1,4-1,6-hexylenedioxy)bis(benzoylacetylene) and 0.108 g (0.3 mmol) of 1,4-bis(6-azidohexyloxy)benzene in 1 mL DMF and 1 mL toluene mixture solvents.

Characterization data: yellow solid, yield: 83.7%. $M_w$ 19100; $M_w/M_n$ 1.8 (GPC, polystyrene calibration). 1,4-disubstituted 1,2,3-triazole content (89.3%). $^1$H NMR (300 MHz, CDCl$_3$), δ (ppm): 8.24, 8.06, 8.00, 7.92, 7.41, 7.15, 6.78, 4.75, 4.44, 4.06, 3.87, 3.27, 1.99, 1.74, 1.56, 1.44. $^{13}$C NMR (75 MHz, CDCl$_3$), δ (ppm): 185.22, 158.92, 152.92, 147.93, 137.59, 129.25, 128.10, 123.17, 120.37, 115.28, 115.10, 68.16, 68.04, 50.53, 30.15, 29.21, 29.15, 26.28, 25.94, 25.61.

EXAMPLE 9

Polytriazole by Polymerization of 3,3'-(1,6-hexylenedioxy)bis(benzoylacetylene) with 1,4-bis(4-azidobutoxy)benzene (PIX)

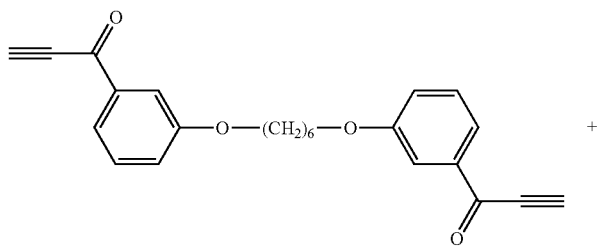

-continued

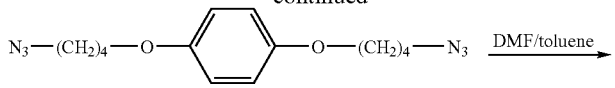

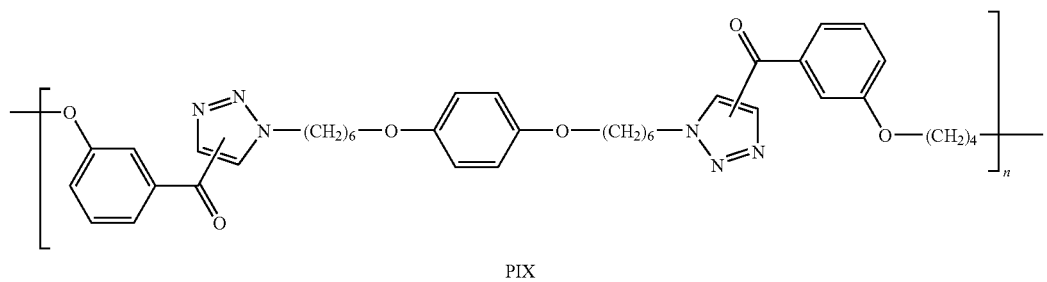

PIX

This polymer was carried out in accordance with the same procedure as described in Example 6 with 74.9 mg (0.2 mmol) of 3,3'-(1,4-1,6-hexylenedioxy)bis(benzoylacetylene) and 60.8 mg (0.2 mmol) of 1,4-bis(4-azidobutoxy)benzene in 0.6 mL DMF and 0.6 mL toluene mixture solvents.

Characterization data: yellow solid, yield: 91.2%. $M_w$ 23700; $M_w/M_n$ 2.1 (GPC, polystyrene calibration). 1,4-disubstituted 1,2,3-triazole content (89.3%). $^1$H NMR (300 MHz, CDCl$_3$), δ (ppm): 8.27, 8.04, 7.91, 7.40, 7.16, 6.79, 4.81, 4.52, 4.05, 3.93, 3.35, 2.17, 1.83, 1.56, 1.27, 0.88. $^{13}$C NMR (75 MHz, CDCl$_3$), δ (ppm): 185.52, 159.23, 153.09, 148.23, 137.90, 129.59, 128.58, 123.46, 120.68, 115.62, 115.54, 68.36, 67.71, 50.64, 29.53, 27.59, 26.55, 26.25.

EXAMPLE 10

Polytriazole by Polymerization of 4,4'-(ethylenedioxydiethoxy) bis(benzoylacetylene) with 1,4-bis(6-azidohexyloxy)benzene (PX)

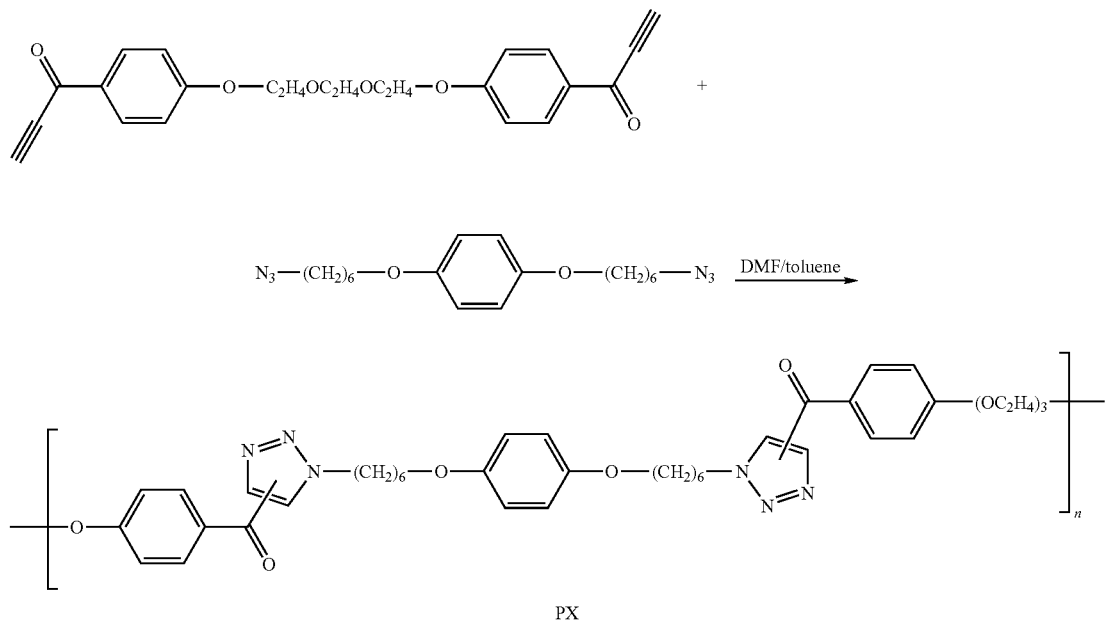

PX

This polymer was carried out in accordance with the same procedure as described in Example 6 with 0.122 g (0.3 mmol) of 4,4'-(ethylenedioxydiethoxy) bis(benzoylacetylene) and 0.108 g (0.3 mmol) of 1,4-bis(6-azidohexyloxy)benzene in 1.0 mL DMF and 1.0 mL toluene mixture solvents.

Characterization data: yellow solid, yield: 90.3%. $M_w$ 8800; $M_w/M_n$ 1.6 (GPC, polystyrene calibration).

EXAMPLE 11

Polytriazole by Polymerization of 4,4'-(ethylenedioxydiethoxy) bis(benzoylacetylene) with 1,4-bis(4-azidobutoxy)benzene (PXI)

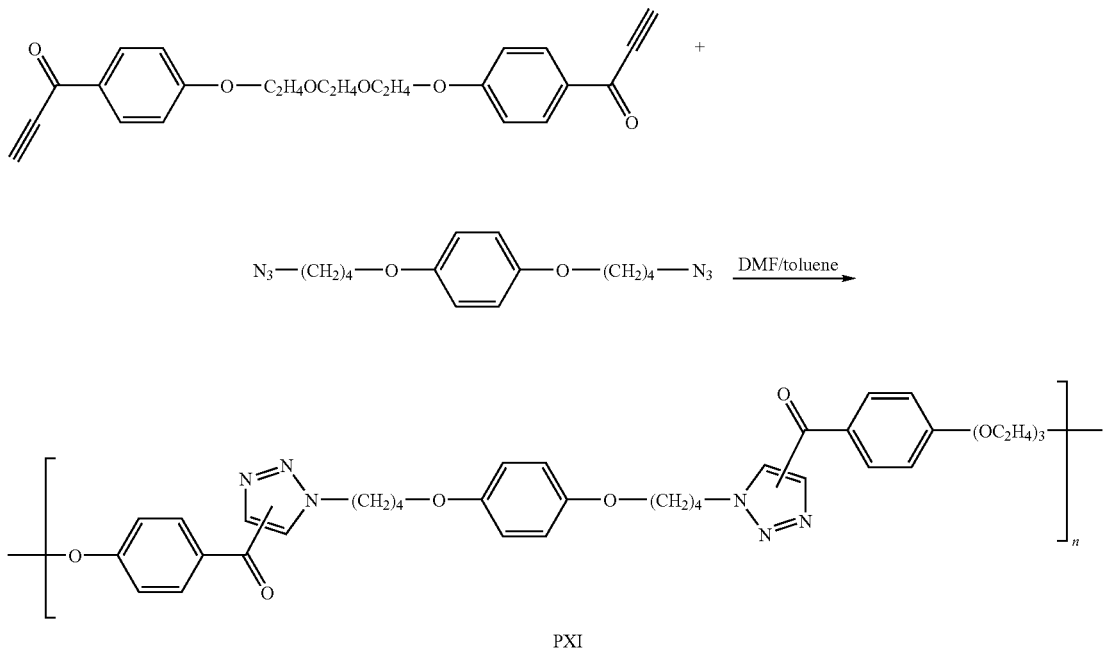

PXI

This polymer was carried out in accordance with the same procedure as described in Example 6 with 81.3 mg (0.2 mmol) of 4,4'-(ethylenedioxydiethoxy) bis(benzoylacetylene) and 60.8 mg (0.2 mmol) of 1,4-bis(4-azidobutoxy)benzene in 0.6 mL DMF and 0.6 mL toluene mixture solvents.

Characterization data: yellow solid, yield: 49.1%. $M_w$ 9100; $M_w/M_n$ 1.7 (GPC, polystyrene calibration).

EXAMPLE 12

Polytriazole by Polymerization of N,N-bis(4-ethynylcarbonylphenylene)aniline with 1,4-bis(azidomethyl)benzene (PXII)

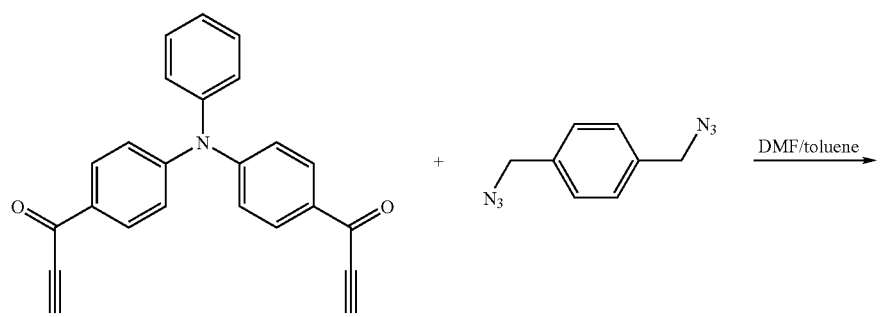

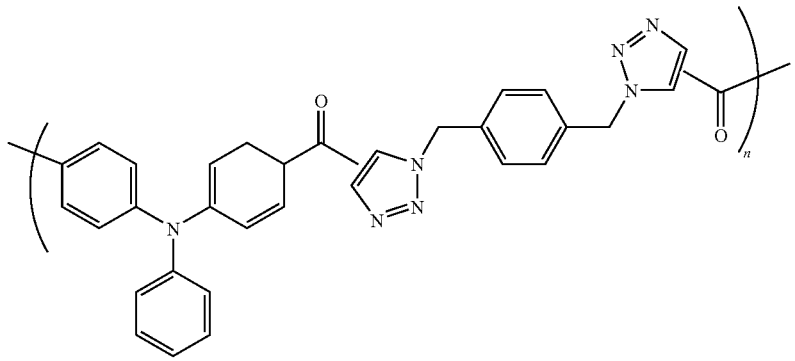

PXII

This polymer was carried out in accordance with the same procedure as described in Example 6 with 54.6 mg (0.15 mmol) of N,N-bis(4-ethynylcarbonylphenylene) aniline and 29 mg (0.15 mmol) of 1,4-bis(azidomethyl)benzene in 0.7 mL DMF and 0.7 mL toluene mixture solvents.

Characterization data: yellow solid, yield: 93.3%. 1,4-disubstituted 1,2,3-triazole content (89.3%). $^1$H NMR (300 MHz, CDCl$_3$), δ (ppm): 8.36, 8.19, 8.04, 8.01, 7.74, 7.36, 7.17, 5.94, 5.61, 4.36, 3.38. Quantum yield in 1,4-dioxane: 45.3% (quinine sulfate in 0.1 NH$_2$SO$_4$ is selected as calibrate).

EXAMPLE 13

Polytriazole by Polymerization of N,N-bis(4-ethynylcarbonylphenyl)aniline with 1,4-bis(4-azidobutoxy)benzene (PXIII)

This polymer was carried out in accordance with the same procedure as described in Example 6 with 70.0 mg (0.2 mmol) of N,N-bis(4-ethynylcarbonylphenyl)aniline and 60.8 mg (0.2 mmol) of 1,4-bis(4-azidobutoxy)benzene in 0.6 mL DMF and 0.6 mL toluene mixture solvents.

Characterization data: Yellow solid; 95.1% yield. $M_w$ 13 700; $M_w/M_n$ 1.8 (GPC, polystyrene calibration). 1,4-disubstituted 1,2,3-triazole content (90.4%). IR (KBr), ν (cm$^{-1}$): 2950, 2871, 2096, 1641, 1583, 1505, 1233, 1178. $^1$H NMR (300 MHz, CDCl$_3$), δ (TMS, ppm): 8.45, 8.31, 8.01, 7.82, 7.37, 7.21, 6.80, 4.80, 4.54, 3.95, 3.35, 2.19, 1.82. $^{13}$C NMR (75 MHz, CDCl$_3$), δ (ppm): 183.82, 152.94, 151.19, 148.39, 145.74, 132.34, 130.85, 129.89, 128.13, 126.93, 122.30, 115.39, 115.31. Quantum yield in THF: 49% (quinine sulfate in 0.1 NH$_2$SO$_4$ is selected as calibrate).

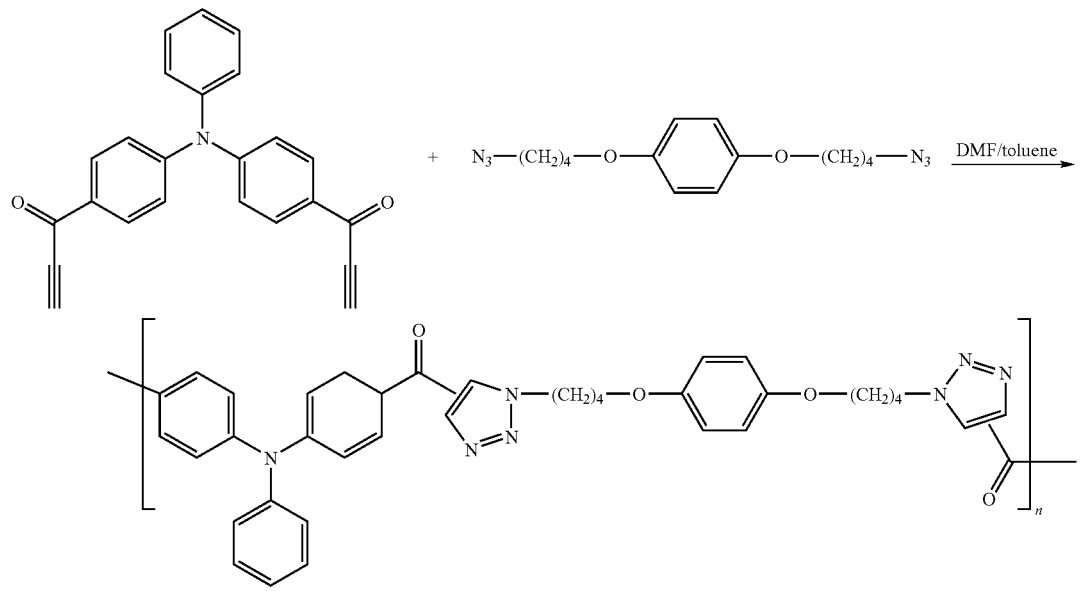

PXIII

EXAMPLE 14

Polytriazole by Polymerization of N,N-bis(4-ethynylcarbonylphenyl)aniline with 1,4-bis(6-azidohexyloxy)benzene (PXIV)

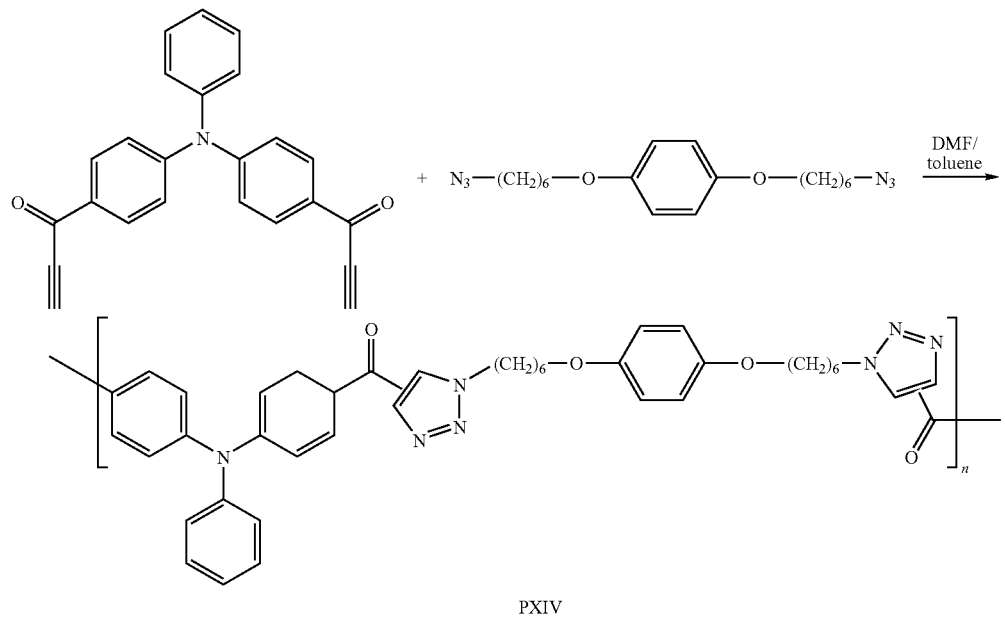

PXIV

This polymer was carried out in accordance with the same procedure as described in Example 6 with 70.0 mg (0.2 mmol) of N,N-bis(4-ethynylcarbonylphenyl)aniline and 72.1 mg (0.2 mmol) of 1,4-bis(6-azidohexyloxy)benzene in 0.6 mL DMF and 0.6 mL toluene mixture solvents.

Characterization data: Yellow solid; 90.2% yield. $M_w$ 14 400; $M_w/M_n$ 1.8 (GPC, polystyrene calibration). 1,4-disubstituted 1,2,3-triazole content (88.4%). IR (KBr), $\nu$ (cm$^{-1}$): 2939, 2862), 2095, 1638, 1583, 1505, 1233, 1177. $^1$H NMR (300 MHz, CDCl$_3$), $\delta$ (TMS, ppm): 8.46, 8.25, 8.00, 7.83, 7.37, 7.19, 6.79, 4.73, 4.46, 3.89, 3.28, 2.01, 1.76, 1.45. $^{13}$C NMR (75 MHz, CDCl$_3$), $\delta$ (ppm): 183.87, 153.07, 151.20, 148.40, 145.76, 132.37, 130.86, 129.89, 127.99, 126.94, 125.75, 122.32, 115.36, 68.15, 50.50, 30.10, 29.08, 26.21, 25.54. Quantum yield in THF: 53% (quinine sulfate in 0.1 N H$_2$SO$_4$ is selected as calibrate).

EXAMPLE 15

Tensile Test of Hyperbranched Polytriazoles Between Two Metal Plates.

Tris(4-ethynylphenyl)amine (0.05 mmol) and 1,4-bis(6-azidohexyloxy)benzene (0.05 mmol) were dissolved in 0.1 mL of THF. The solution was then dropped onto the metal (copper, aluminum, iron) sample cell (1.2 inch) and then covered with another plate. The whole cells were put into oven to cure at 100° C. overnight. The area for loading cell is 25.4 mm×25.4 mm and the test speed is 2.0 mm/min. The mechanical data are shown in Table 4.

TABLE 1

Effect of Solvent on Thermal Click Polymerization[a]

| entry | solvent | time (h) | yield (%) | $M_w$[b] | $M_w/M_n$[b] |
|---|---|---|---|---|---|
| 1 | toluene | 90 | trace | 1 900 | 1.3 |
| 2 | tetralin | 90 | 31.0 | 5 100 | 2.1 |
| 3 | chlorobenzene | 77 | 39.2 | 3 900 | 1.7 |
| 4 | o-DCB[c] | 77 | 50.1 | 5 200 | 1.9 |
| 5 | 1,4-dioxane | 77 | 79.7 | 5 800 | 2.3 |

[a]Carried out at 110° C. under nitrogen; the molar ratio of tris(4-ethynylphenyl)amine and 1,4-bis(4-azidobutoxy)benzene is 2:3; the concentration of tris(4-ethynylphenyl)amine is 0.067 M (entries 1 and 2) and 0.1 M (entries 3-5).
[b]Determined by GPC in THF on the basis of a polystyrene calibration.
[c]o-DCB = 1,2-dichlorobenzene.

TABLE 2

Characterization of Hyperbranched Polytriazoles[a]

| monomers | yield (%) | $M_w$[b] | $M_w/M_n$[b] | $T_d$[c] (° C.) | $\Phi_F$[d] (%) |
|---|---|---|---|---|---|
| I | 64.0 | 5 500 (8 200) | 2.0 (2.3) | 405 | 38 |
| II | 75.7 | 11 400 (16 000) | 2.7 (4.3) | 402 | 43 |

[a]Carried out in 1,4-dioxane at refluxing temperature under nitrogen for 72 hours; the monomers are tris(4-ethynylphenyl)amine and 1,4-bis(4-azidobutoxy)benzene in a molar ratio of 2:3; the concentration of tris(4-ethynylphenyl)amine is 0.12 M.
[b]Measured in THF by GPC and LS (data given in the parentheses).
[c]Temperature at which 10% weight loss was recorded by TGA.
[d]Fluorescence quantum yield measured in DCM using 9,10-diphenylanthracene in cyclohexane ($\Phi_F$ = 90%) as standard.

TABLE 3

Characterization of linear poly(aroyltriazole)s[a]

| polymer | $M_w$ | $M_w/M_n$ | yield (%) | 1,4-conf. (%)[b] |
|---|---|---|---|---|
| PVI | 26 700 | 1.99 | 92.0 | 88.5 |
| PVII | 15 900 | 1.77 | 89.6 | 88.5 |
| PVIII | 19 100 | 1.80 | 83.7 | 89.3 |
| PIX | 23 700 | 2.09 | 91.2 | 89.3 |

[a]Reacted at 100° C. for 6 hour; [M] = 0.15 M.
[b]1,4-conf. means the percentage of 1,4-disubstituted 1,2,3-triazoles inside the polymers.

TABLE 4

Mechanical properties of metal plates adhered by hyperbranched Polytriazoles.

| Metal | Peak load (N) | Peak stress (MPa) | Strain at break (mm/mm) | Modulus (MPa) |
|---|---|---|---|---|
| Cu | 652.1 | 1.0 | 0.020 | 57.0 |
| Al | 360.8 | 0.6 | 0.038 | 16.4 |
| Fe | 295.0 | 0.5 | 0.028 | 22.6 |

Chart 1

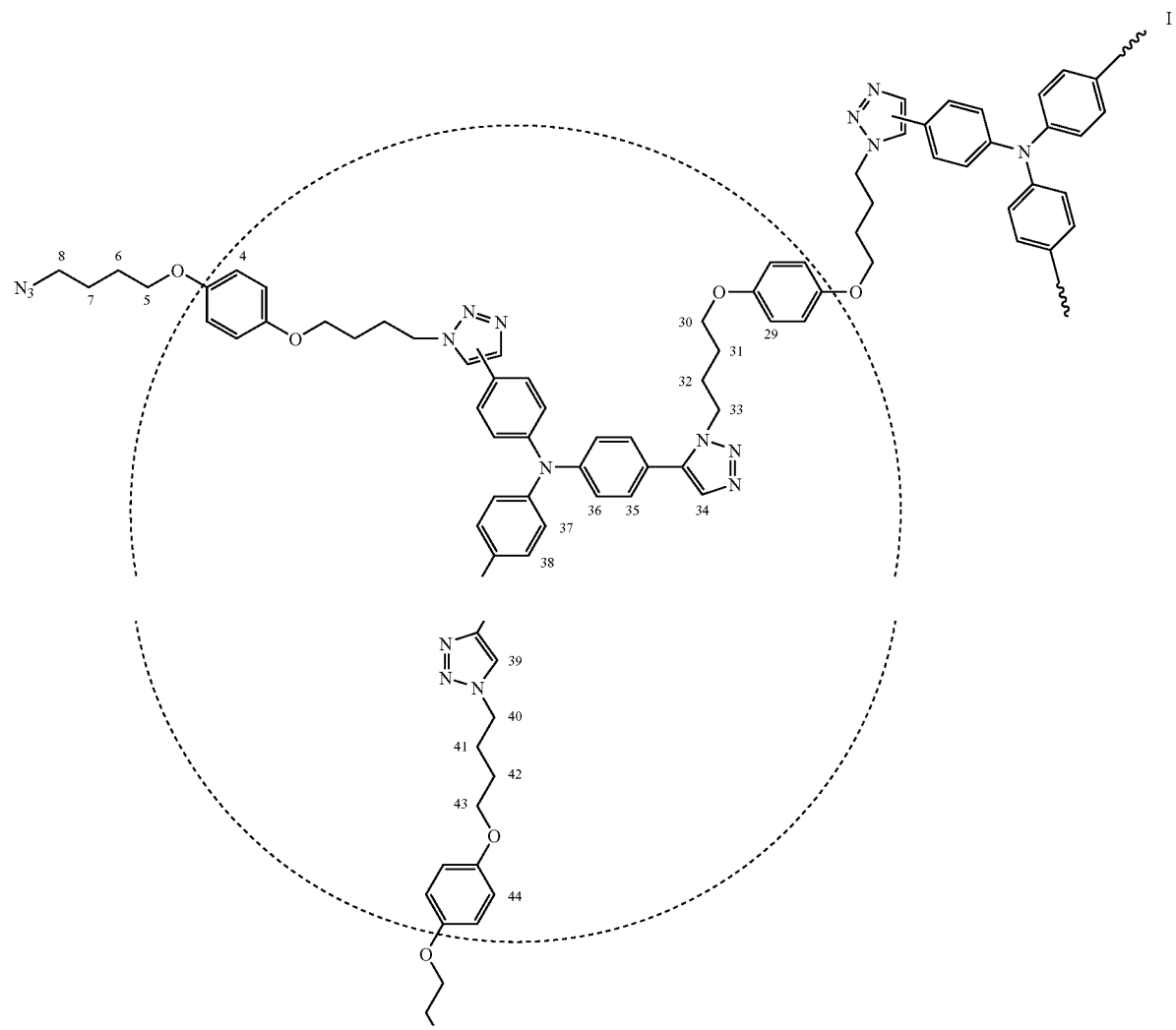

-continued
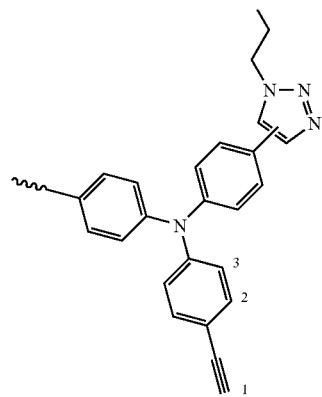
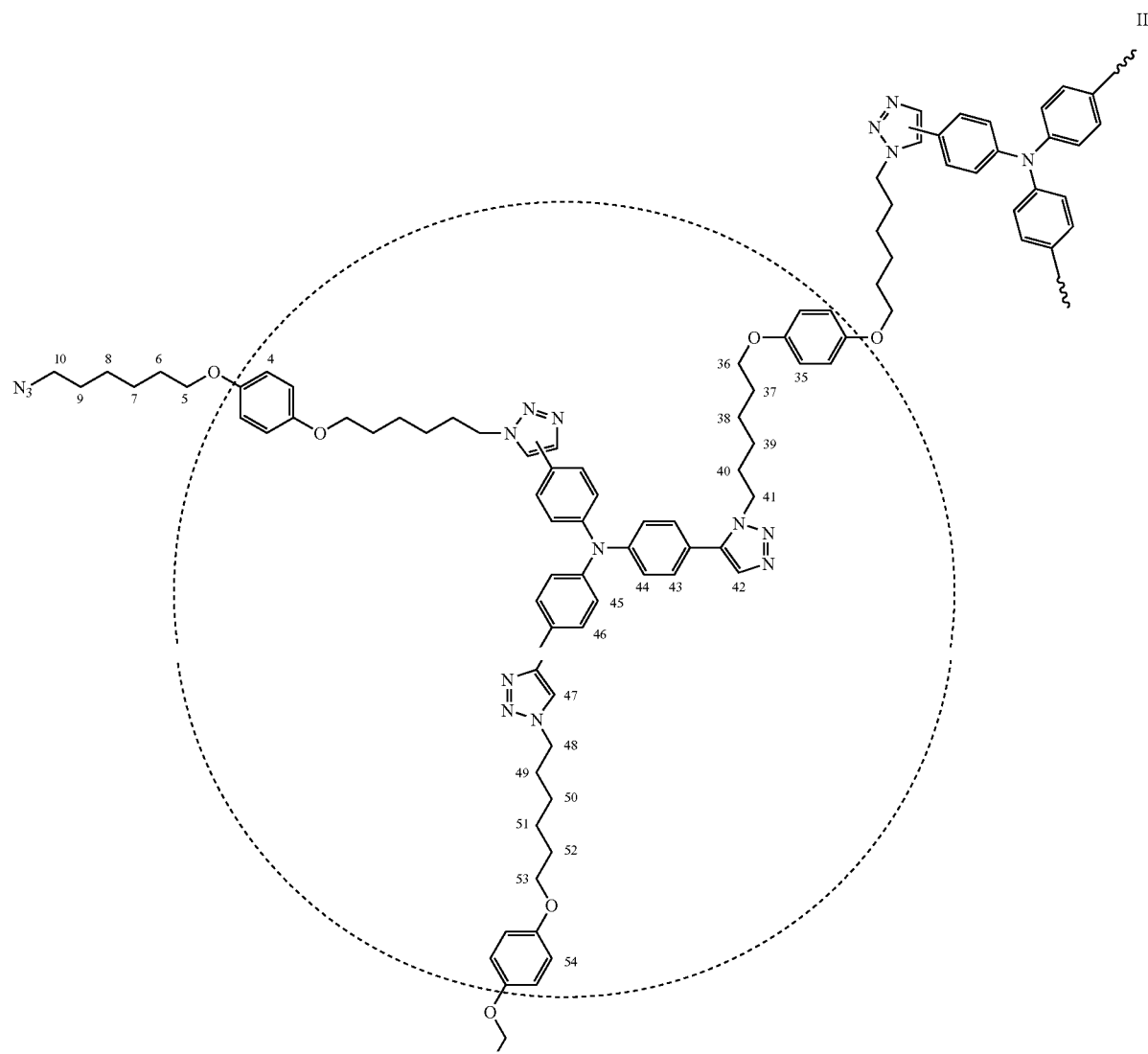

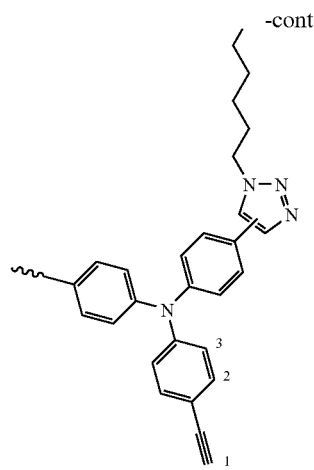

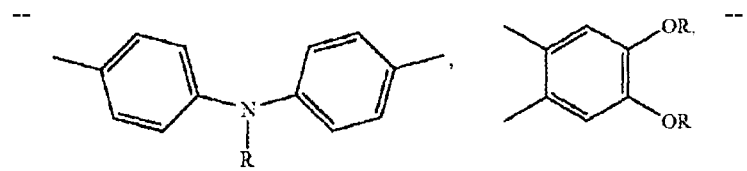

What is claimed is:

1. A process for the synthesis of poly(aroyltriazoles), comprising: reacting separate azide monomers and acetylene monomers by 1,3-dipolar cycloaddition, wherein one of the azide monomers and acetylene monomers is a di-monomer and the other monomer is a tri-monomer, and wherein polymerization occurs by refluxing said monomers in an organic solvent; wherein the acetylene monomer has formula II or IV:

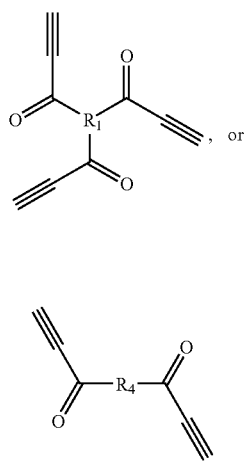

wherein $R_1$ is

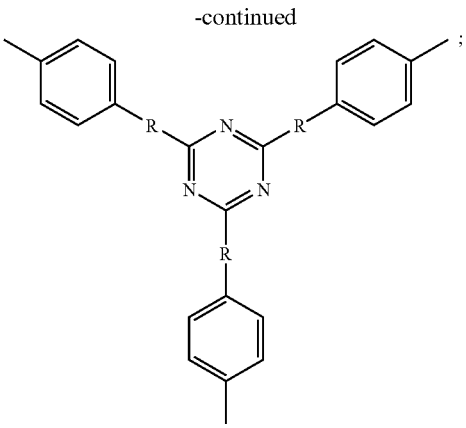

$R_4$ is

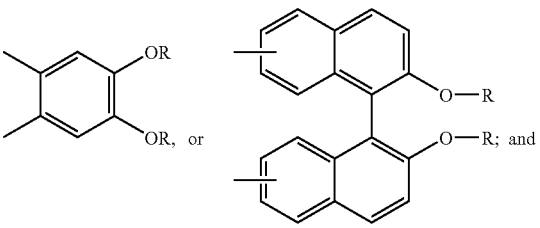

R is an alkyl, a vinyl, an acetyl, an aryl or a heteroaryl.

2. The process according to claim 1, wherein the azide monomers are selected from the group consisting of diazides, conjugated diazides, nonconjugated diazides, triazides, conjugated triazides, nonconjugated triazides, metal containing diazides, metal containing conjugated diazides, metal containing nonconjugated diazides, metal containing triazides, metal containing conjugated triazides and metal containing nonconjugated triazides.

3. The process according to claim 1, wherein the azide monomer has formula V or VI:

$$N_3-R_2-N_3 \quad (V)$$

-continued

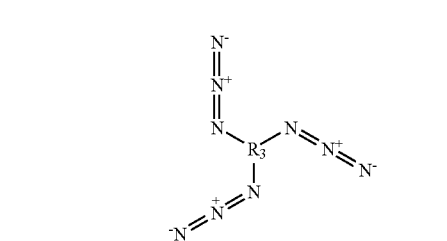

wherein $R_2$ is

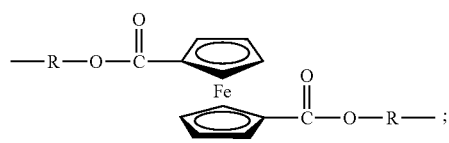

Ar is

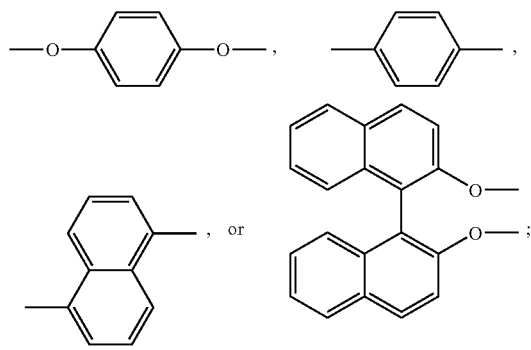

m > 1;

$R_3$ is

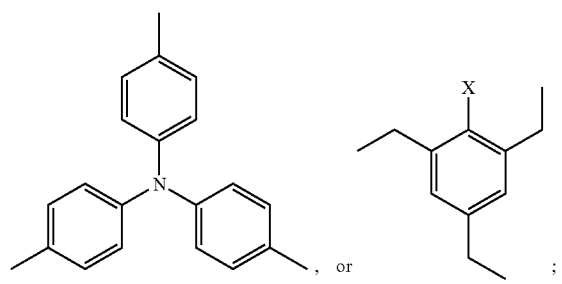

X is hydrogen, an alkyl, a vinyl, an acetyl, an aryl, a heteroaryl, or a halogen; and R is an alkyl, a vinyl, an acetyl, an aryl or a heteroaryl.

4. The process according to claim 1, wherein the organic solvent is selected from the group consisting of 1,4-dioxane, dimethylformamide, toluene, and mixtures thereof.

5. The process according to claim 1, wherein said polymerization occurs for about 4 to about 6 hours.

6. A polytriazole prepared by the process according to claim 1, wherein the poly(aroyltriazole) has the formula IX:

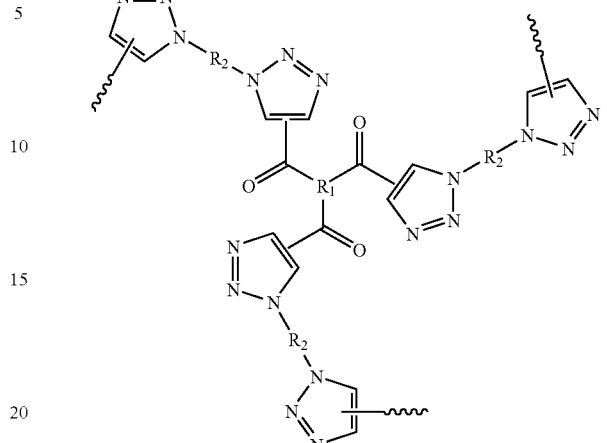

wherein $R_1$ is

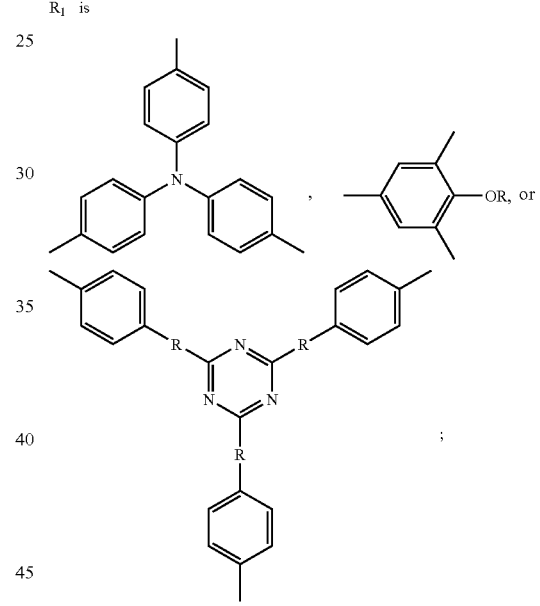

R is an alkyl, a vinyl, an acetyl, an aryl, or a heteroaryl;

$R_2$ is

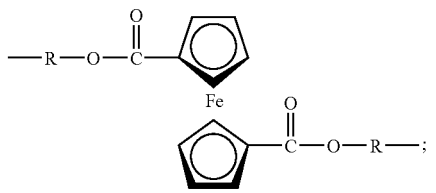

Ar is

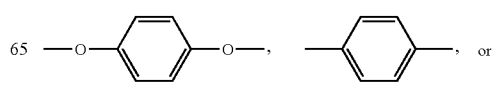

-continued

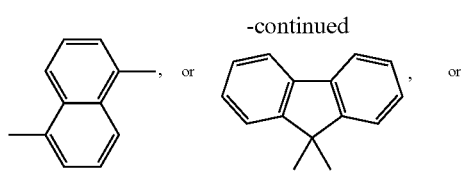

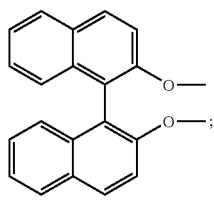

and m>1.

7. A poly(aroyltriazole) prepared by the process according to claim 1, wherein the poly(aroyltriazole) has the formula X:

(X)

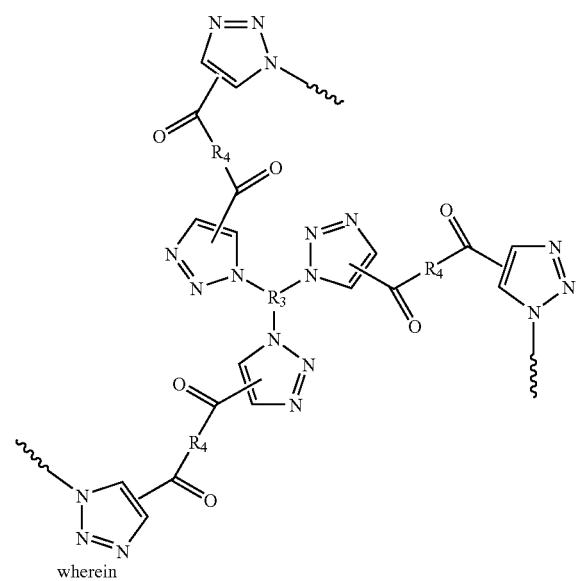

wherein $R_3$ is

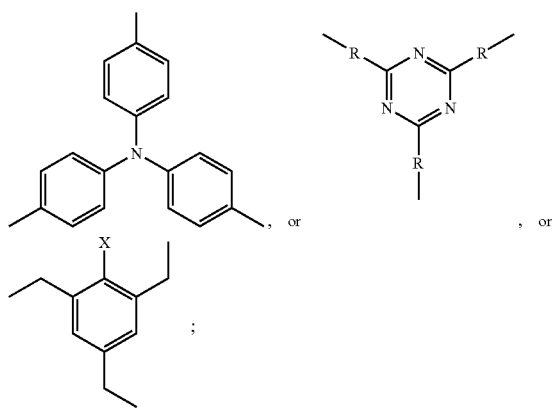

R is an alkyl, a vinyl, an acetyl, an aryl, or a heteroaryl;

X is hydrogen, an alkyl, a vinyl, an acetyl, an aryl, a heteroaryl, halogen;

$R_4$ is

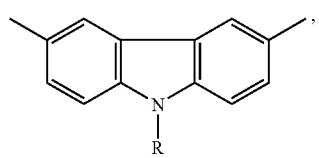

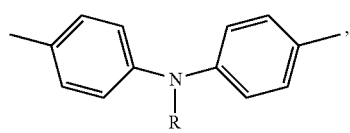

8. A process for the synthesis of poly(aroyltriazoles), comprising: polymerizing separate diazide monomers and aroyldiacetylene monomers by 1,3-dipolar cycloaddition wherein polymerization occurs by refluxing said monomers in an organic solvent; wherein the diazide monomer has formula XI:

$$N_3-R_2-N_3 \quad (XI)$$

wherein $R_2$ is

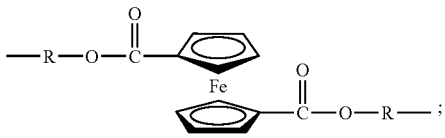

R is a an alkyl, a vinyl, an acetyl, an aryl, or a heteroaryl;

Ar is

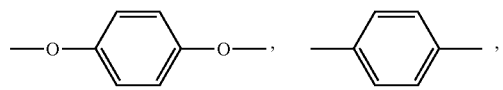

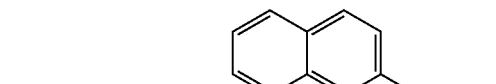

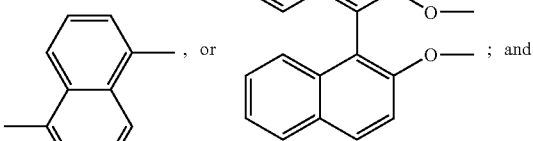

m>1.

9. The process according to claim 8, wherein the aroyldiacetylene monomers are selected from the group consisting of aroyldiacetylenes and metal containing aroyldiacetylenes.

10. The process according to claim 8, wherein the aroyldiacetylene monomer has formula XII:

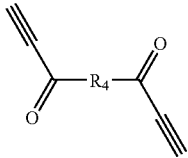
(XII)

wherein

R₄ is

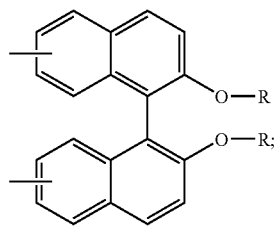

and

R is hydrogen, an alkyl, a vinyl, an acetyl, an aryl or a heteroaryl.

11. The process according to claim 8, wherein the organic solvent is selected from the group consisting of 1,4-dioxane, dimethylformamide, toluene, and mixtures thereof.

12. The process according to claim 8, wherein the poly (aroyltriazoles) are compounds of formula XIII:

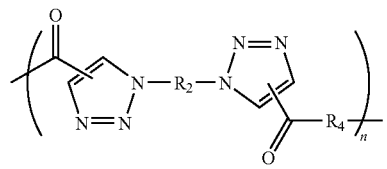
(XIII)

wherein

R₂ is ―(CH₂)$_m$―Ar―(CH₂)$_m$―, or

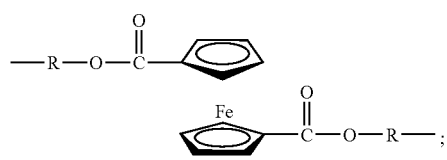

Ar is

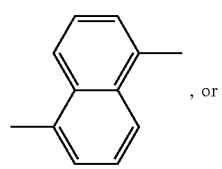, or

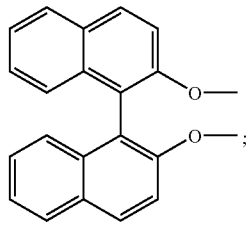

R₄ is 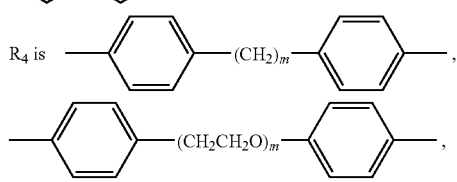

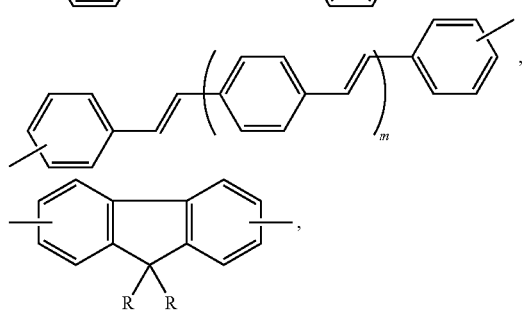

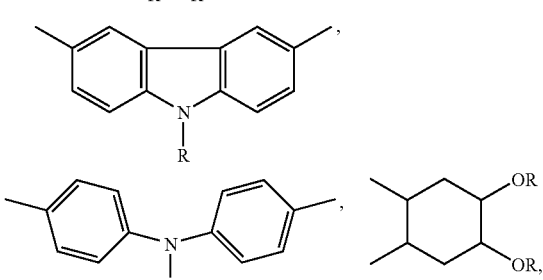

R is, an alkyl, a vinyl, an acetyl, an aryl or a heteroaryl; and m >1.

13. A poly(aroyltriazole) prepared by the process of claim 8, wherein the poly(aroyltriazole) has the formula XIV:

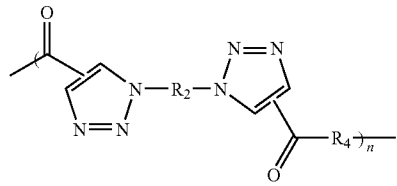

(XIV)

wherein $R_2$ is

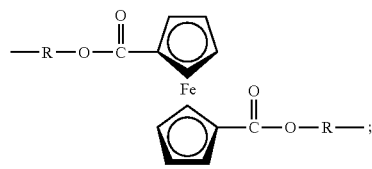

Ar is

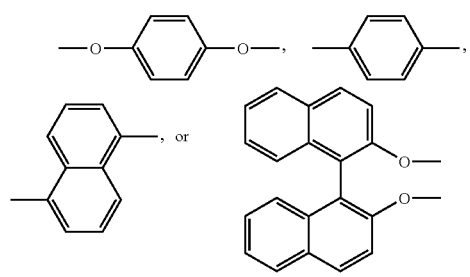

$R_4$ is

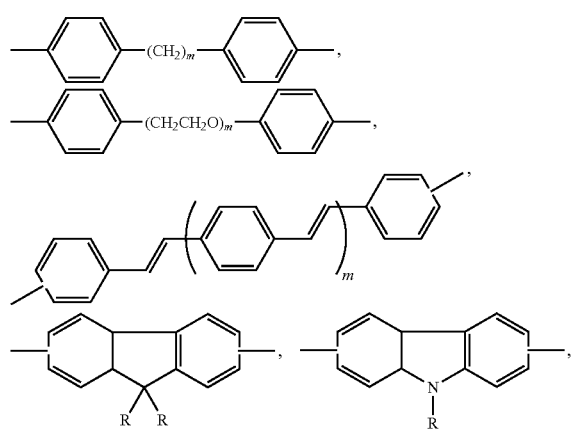

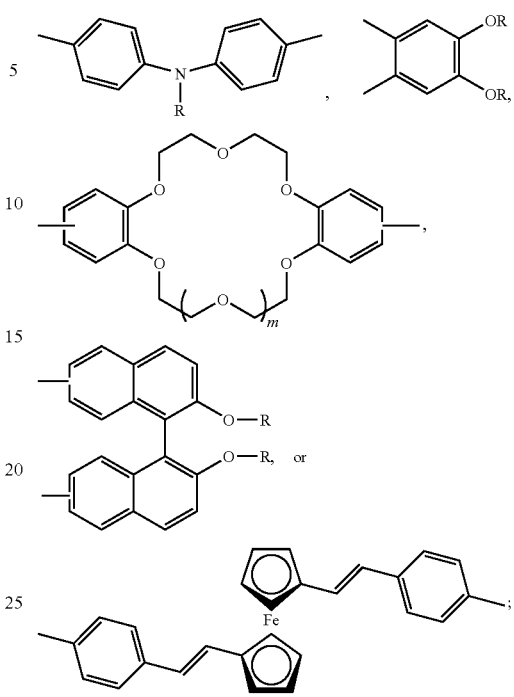

R is hydrogen, an alkyl, a vinyl, an acetyl, an aryl or a heteroaryl; and $m > 1$.

14. The process according to claim 1, wherein the comonomers are mixed together in dimethylformamide and optimally an additional solvent selected from the group consisting of toluene, dioxane, and benzene.

15. The process according to claim 1, wherein the comonomers are mixed in dimethylformamide and toluene.

16. The process according to claim 15, wherein the dimethylformamide and toluene are present in a ratio of 1:1 (volume:volume).

17. The process according to claim 14, wherein the comonomers are reacted at 0-200° C. for 1-24 hours.

18. A light emissive polymer synthesized by the process according claim 1.

* * * * *

UNITED STATES PATENT AND TRADEMARK OFFICE
CERTIFICATE OF CORRECTION

PATENT NO. : 7,772,358 B2 Page 1 of 2
APPLICATION NO. : 11/896675
DATED : August 10, 2010
INVENTOR(S) : Benzhong Tang, Anjun Qin and Matthias Haeussler It is certified that error appears in the above-identified patent and that said Letters Patent is hereby corrected as shown below:

Claim 7, Column 50, Lines 5-20:
Please delete:
"$R_4$ is

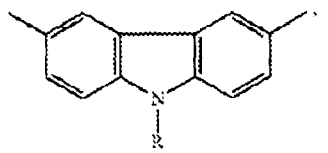

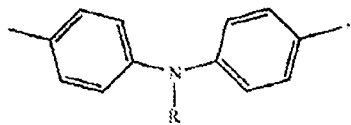

"

and replace with:

-- $R_4$ is

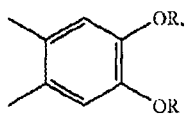

. --

Signed and Sealed this

Twenty-sixth Day of October, 2010

David J. Kappos
*Director of the United States Patent and Trademark Office*

CERTIFICATE OF CORRECTION (continued)
U.S. Pat. No. 7,772,358 B2

Claim 12, Column 52, Lines 35-39:
Please delete:

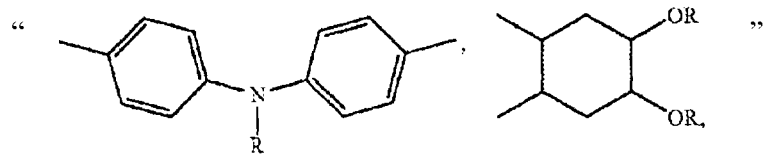

and replace with: